US010455484B2

(12) United States Patent
Zhou et al.

(10) Patent No.: US 10,455,484 B2
(45) Date of Patent: Oct. 22, 2019

(54) METHODS AND SYSTEMS FOR ACCESS POINT CLUSTERING

(71) Applicant: QUALCOMM Incorporated, San Diego, CA (US)

(72) Inventors: Yan Zhou, San Diego, CA (US); Abhishek Pramod Patil, San Diego, CA (US); George Cherian, San Diego, CA (US); Alfred Asterjadhi, San Diego, CA (US); Venkata Ramanan Venkatachalam Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/874,636

(22) Filed: Jan. 18, 2018

(65) Prior Publication Data

US 2018/0249401 A1 Aug. 30, 2018

Related U.S. Application Data

(60) Provisional application No. 62/464,943, filed on Feb. 28, 2017.

(51) Int. Cl.
*H04W 48/16* (2009.01)
*H04B 7/0413* (2017.01)
(Continued)

(52) U.S. Cl.
CPC ............ *H04W 48/16* (2013.01); *H04B 7/024* (2013.01); *H04B 7/0413* (2013.01);
(Continued)

(58) Field of Classification Search
CPC .... H04B 7/0413; H04B 7/0617; H04B 7/024; H04W 48/16; H04W 74/0825; H04W 88/08; H04W 92/20
See application file for complete search history.

(56) References Cited

U.S. PATENT DOCUMENTS 9,288,690 B2    3/2016  Brueck et al.
2011/0294527 A1* 12/2011  Brueck ................. H04W 24/02
                                                455/466

(Continued)

OTHER PUBLICATIONS

International Search Report and Written Opinion—PCT/US2018/015040—ISA/EPO—dated May 3, 2018.

(Continued)

*Primary Examiner* — Rina C Pancholi
(74) *Attorney, Agent, or Firm* — Steven R. Thiel; Paradice and Li LLP

(57) ABSTRACT

Distributed MIMO communication utilizes multiple access points within a cluster. Methods and systems for access point discovery provide for formation of a cluster to support the distributed MIMO communication. In one aspect, a method includes generating, by a first access point, a first message indicating the first access point has distributed MIMO capability and transmitting, by the first access point, the first message on a wireless network. The method further includes receiving, by the first access point, a second message from a second access point, the second message identifying a cluster and determining, by the first access point, to participate in the identified cluster in response to the second message.

28 Claims, 16 Drawing Sheets

(51) Int. Cl.
*H04B 7/06* (2006.01)
*H04W 74/08* (2009.01)
*H04B 7/024* (2017.01)
*H04W 24/02* (2009.01)
*H04W 92/20* (2009.01)
*H04W 88/08* (2009.01)

(52) U.S. Cl.
CPC .......... *H04B 7/0617* (2013.01); *H04W 24/02* (2013.01); *H04W 74/0825* (2013.01); *H04W 88/08* (2013.01); *H04W 92/20* (2013.01)

(56) References Cited

U.S. PATENT DOCUMENTS

| | | | | |
|---|---|---|---|---|
| 2012/0094710 A1* | 4/2012 | Jia | ................. | H04W 72/044 455/524 |
| 2013/0077521 A1* | 3/2013 | Feng | ................. | H04W 36/0083 370/252 |
| 2015/0023213 A1* | 1/2015 | Soneda | ................. | H04W 40/32 370/254 |
| 2015/0263834 A1* | 9/2015 | Won | ................. | H04B 7/022 370/329 |
| 2015/0288427 A1* | 10/2015 | Wang | ................. | H04W 72/1273 370/329 |
| 2017/0006570 A1* | 1/2017 | Xu | ................. | H04W 56/00 |

OTHER PUBLICATIONS

Shyy D.J., "Universal Cooperative Protocol With Mesh Aware Engine", IEEE Draft; IEEE 802.11-05/0602r4, IEEE-SA Mentor, Piscataway, NJ USA, val. 802.11s, No. 4, Jul. 19, 2005 (Jul. 19, 2005), pp. 1-56.

* cited by examiner

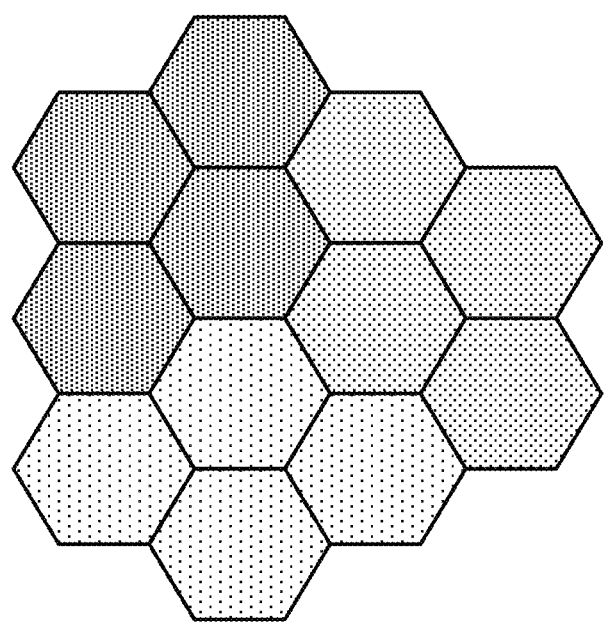
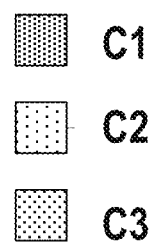
FIG. 5

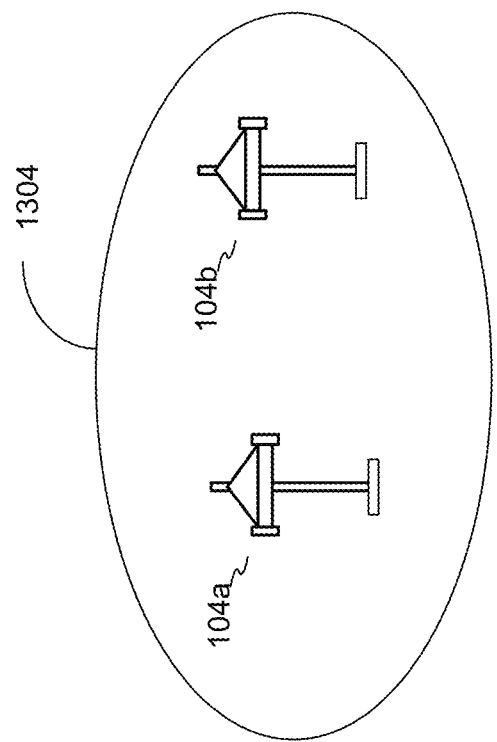
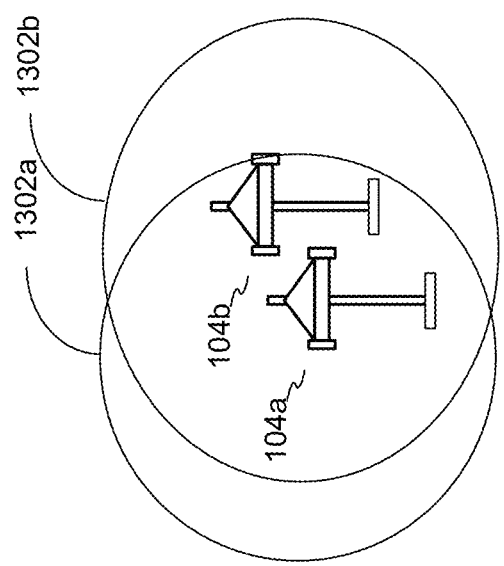
FIG. 13

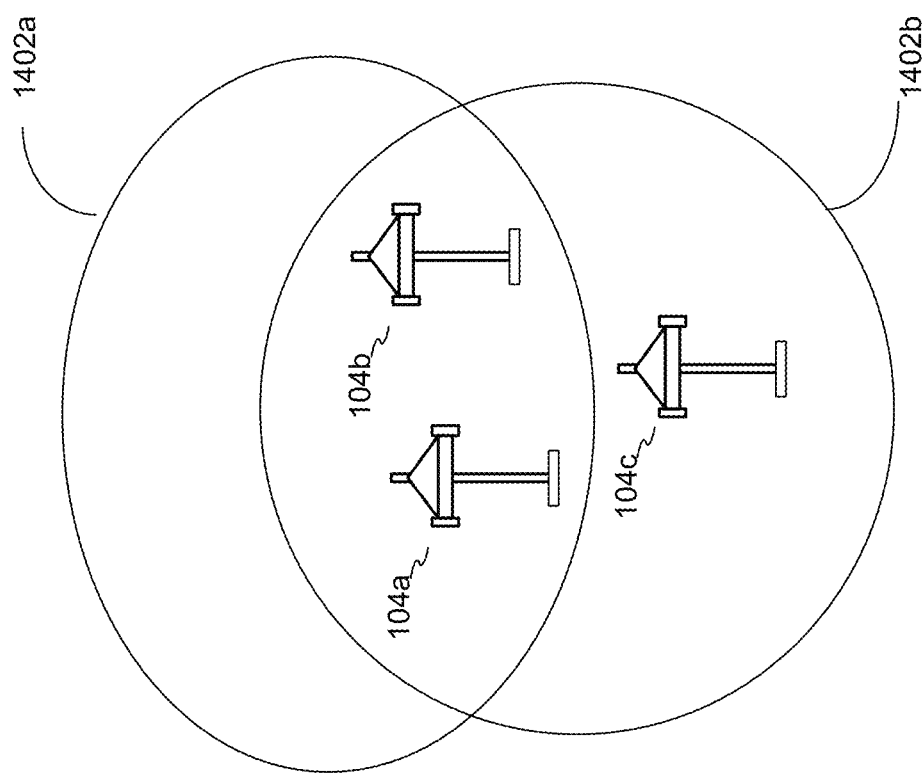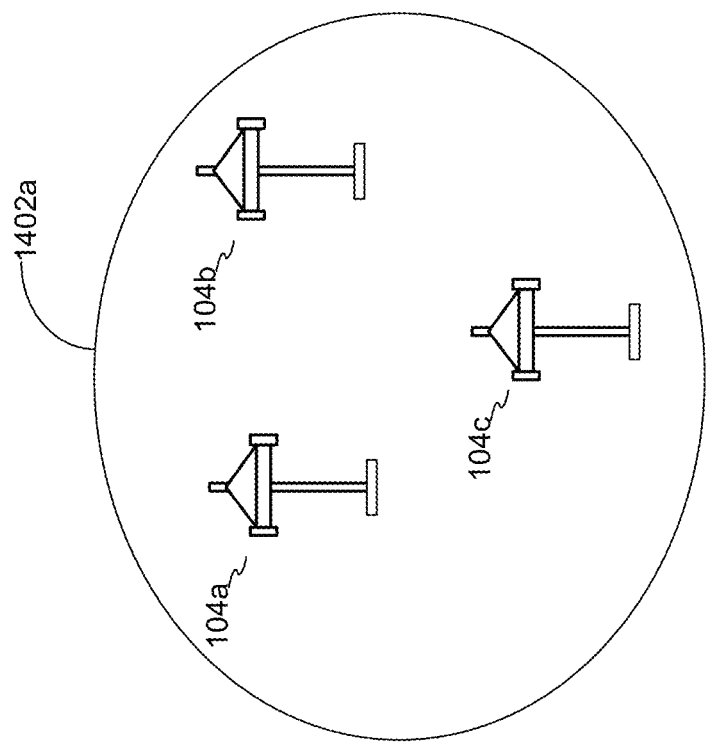
FIG. 14

METHODS AND SYSTEMS FOR ACCESS POINT CLUSTERING

CROSS-REFERENCE TO RELATED APPLICATIONS

This application claims the benefit of priority to U.S. Provisional Appl. No. 62/464,943, filed Feb. 28, 2017, which is incorporated in its entirety by reference herein.

TECHNICAL FIELD

This application relates generally to wireless communication, and more specifically to systems and methods for clustering access points for distributed MIMO communication.

BACKGROUND

Wireless communications systems are widely deployed to provide various types of communication content such as voice, video, packet data, messaging, broadcast, and so on. Wi-Fi or WiFi (e.g., IEEE 802.11) is a technology that allows electronic devices to connect to a wireless local area network (WLAN). A WiFi network may include an access point (AP) that may communicate with one or more other electronic devices (e.g., computers, cellular phones, tablets, laptops, televisions, wireless devices, mobile devices, "smart" devices, etc.), which can be referred to as stations (STAs). The AP may be coupled to a network, such as the Internet, and may enable one or more STAs to communicate via the network or with other STAs coupled to the AP.

Many wireless networks utilize carrier-sense multiple access with collision detection (CSMA/CD) to share a wireless medium. With CSMA/CD, before transmission of data on the wireless medium, a device may listen to the medium to determine whether another transmission is in progress. If the medium is idle, the device may attempt a transmission. The device may also listen to the medium during its transmission, so as to detect whether the data was successfully transmitted, or if perhaps a collision with a transmission of another device occurred. When a collision is detected, the device may wait for a period of time and then re-attempt the transmission. The use of CSMA/CD allows for a single device to utilize a particular channel (such as a spatial or frequency division multiplexing channel) of a wireless network.

Users continue to demand greater and greater capacity from their wireless networks. For example, video streaming over wireless networks is becoming more common. Video teleconferencing may also place additional capacity demands on wireless networks. In order to satisfy the bandwidth and capacity requirements users require, improvements in the ability of a wireless medium to carry larger and larger amounts of data are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In at least one aspect, a method of discovering access points for distributed multiple-in-multiple-out (MIMO) communication is disclosed. The method comprises generating, by a first access point, a first message indicating the first access point has distributed MIMO capability and transmitting, by the first access point, the first message on a wireless network. The method further comprises receiving, by the first access point, a second message from a second access point, the second message identifying a cluster and determining, by the first access point, to participate in the identified cluster in response to the second message.

In an additional aspect, a method of discovering access points for distributed MIMO communication is disclosed. The method comprises receiving, by a first access point, a message indicating a second access point has distributed MIMO capability and decoding the message to identify cluster. The method further comprises determining, by the first access point, to participate in the identified cluster in a distributed MIMO communication.

In another aspect, an apparatus for discovering access points for distributed MIMO communication is disclosed. The apparatus comprises a hardware processor, a transmitter, and a receiver. The hardware processor is configured to generate a first message indicating a first access point has distributed MIMO capability. The transmitter is configured to transmit the first message on a wireless network. The receiver is configured to receive a second message from a second access point, the second message identifying a cluster. The hardware processor is further configured to participate in the identified cluster in response to the second message.

In an additional aspect, an apparatus for discovering access points for distributed MIMO communication is disclosed. The apparatus comprises a receiver and a hardware processor. The receiver is configured to receive, by a first access point, a message indicating a second access point has distributed MIMO capability. The hardware processor is configured to decode the message to identify a cluster and determine to participate in the identified cluster in a distributed MIMO communication.

BRIEF DESCRIPTION OF THE DRAWINGS

FIG. 5 schematically illustrates an example plurality of basic service sets (BSSs) of a distributed MIMO wireless communication system grouped into clusters in accordance with certain embodiments described herein.

FIG. 13 is a diagram illustrating formation of a new access point cluster.

FIG. 14 is a diagram illustrating an access point joining an existing cluster of another access point.

DETAILED DESCRIPTION

Figure 1:
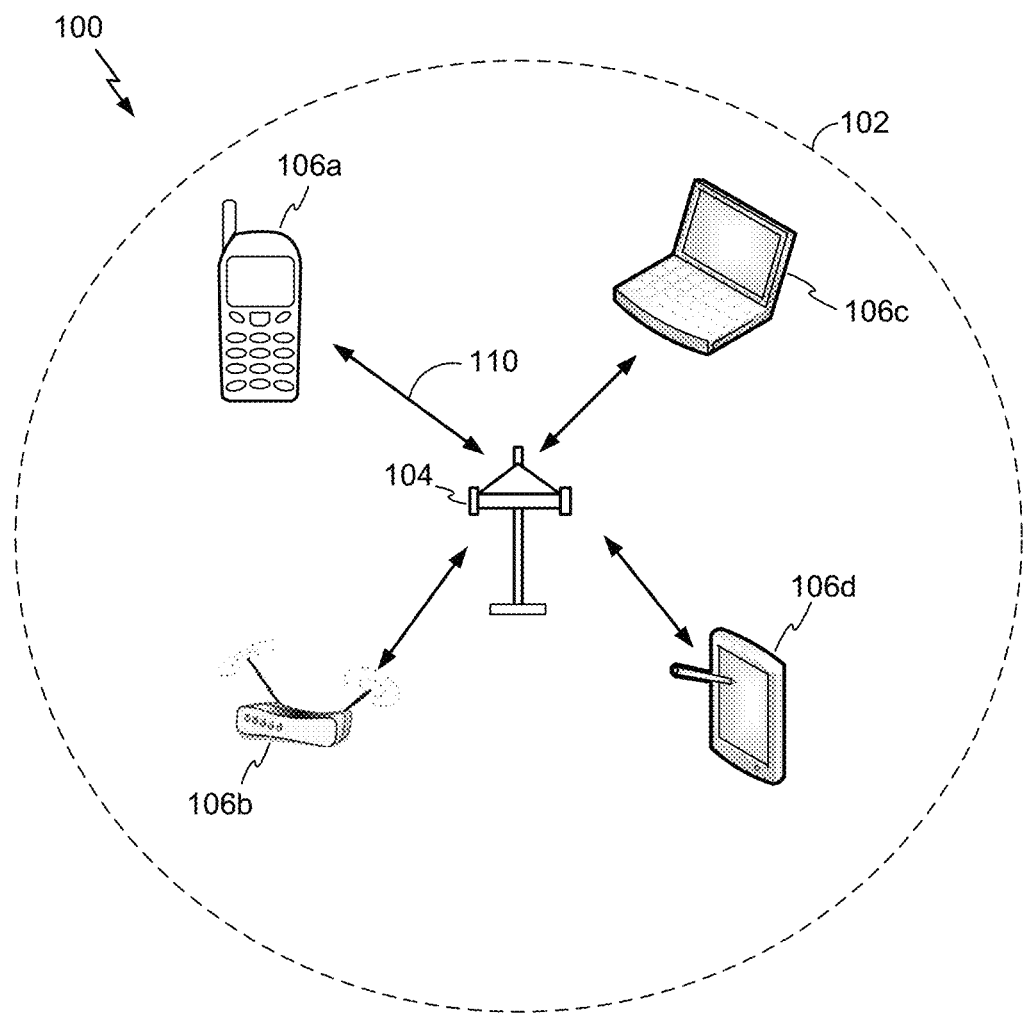
FIG. 1 schematically illustrates an example wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently or combined with any other aspect of the disclosure. In addition, the scope is intended to cover such an apparatus or method which is practiced using other structure and functionality as set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown, but is to be accorded with the widest scope consistent with the principles and features disclosed herein.

Wireless access network technologies may include various types of wireless local area access networks (WLANs). A WLAN may be used to interconnect nearby devices together, employing widely used access networking protocols. The various aspects described herein may apply to any communication standard, such as Wi-Fi or, more generally, any member of the IEEE 802.11 family of wireless protocols.

In some implementations, a WLAN includes various devices which access the wireless access network. For example, there may be: access points ("APs") and clients (also referred to as stations, or "STAs"). In general, an AP serves as a hub or a base station for the STAs in the WLAN. A STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area access networks. In some implementations an STA may also be used as an AP.

An access point ("AP") may comprise, be implemented as, or known as a NodeB, Radio Access network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, a user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, a Node-B (Base-station), or any other suitable device that is configured to communicate via a wireless medium.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). The cdma2000 is described in documents from an organization named "3rd Generation Partnership Project 2" (3GPP2). These various radio technologies and standards are known in the art.

FIG. 1 is a diagram that illustrates a multiple-access multiple-input multiple-output (MIMO) system 100 with APs and STAs. For simplicity, only one AP 104 is shown in FIG. 1. As described above, the AP 104 communicates with the STAs 106a-d (also referred to herein collectively as "the STAs 106" or individually as "the STA 106") and may also be referred to as a base station or using some other terminology. Also as described above, a STA 106 may be fixed or mobile and may also be referred to as a user terminal, a mobile station, a wireless device, or using some other terminology. The AP 104 may communicate with one or more STAs 106 at any given moment on the downlink or uplink. The downlink (i.e., forward link) is the communication link from the AP 104 to the STAs 106, and the uplink (i.e., reverse link) is the communication link from the STAs 106 to the AP 104. A STA 106 may also communicate peer-to-peer with another STA 106.

Portions of the following disclosure will describe STAs 106 capable of communicating via Spatial Division Multiple Access (SDMA). Thus, for such aspects, the AP 104 may be configured to communicate with both SDMA and non-SDMA STAs. This approach may conveniently allow older versions of STAs (e.g., "legacy" STAs) that do not support SDMA to remain deployed in an enterprise, extending their useful lifetime, while allowing newer SDMA STAs to be introduced as deemed appropriate.

The MIMO system 100 may employ multiple transmit and multiple receive antennas for data transmission on the downlink and uplink. The AP 104 is equipped with Nap antennas and represents the multiple-input (MI) for downlink transmissions and the multiple-output (MO) for uplink transmissions. A set of K selected STAs 106 collectively represents the multiple-output for downlink transmissions and the multiple-input for uplink transmissions. For pure SDMA, it is desired to have Nap≤K≤1 if the data symbol streams for the K STAs are not multiplexed in code, frequency or time by some means. K may be greater than Nap if the data symbol streams can be multiplexed using TDMA technique, different code channels with CDMA, disjoint sets of sub-bands with OFDM, and so on. Each selected STA may transmit user-specific data to and/or receive user-specific data from the AP. In general, each selected STA may be equipped with one or multiple antennas (i.e., Nut≥1). The K selected STAs can have the same number of antennas, or one or more STAs may have a different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each STA may be equipped with a single antenna (e.g., in order to keep costs down) or multiple antennas (e.g., where the additional cost can be supported). The MIMO system 100 may also be a TDMA system if the STAs 106 share the same frequency channel by dividing transmission/reception into different time slots, where each time slot may be assigned to a different STA 106.

Figure 2:
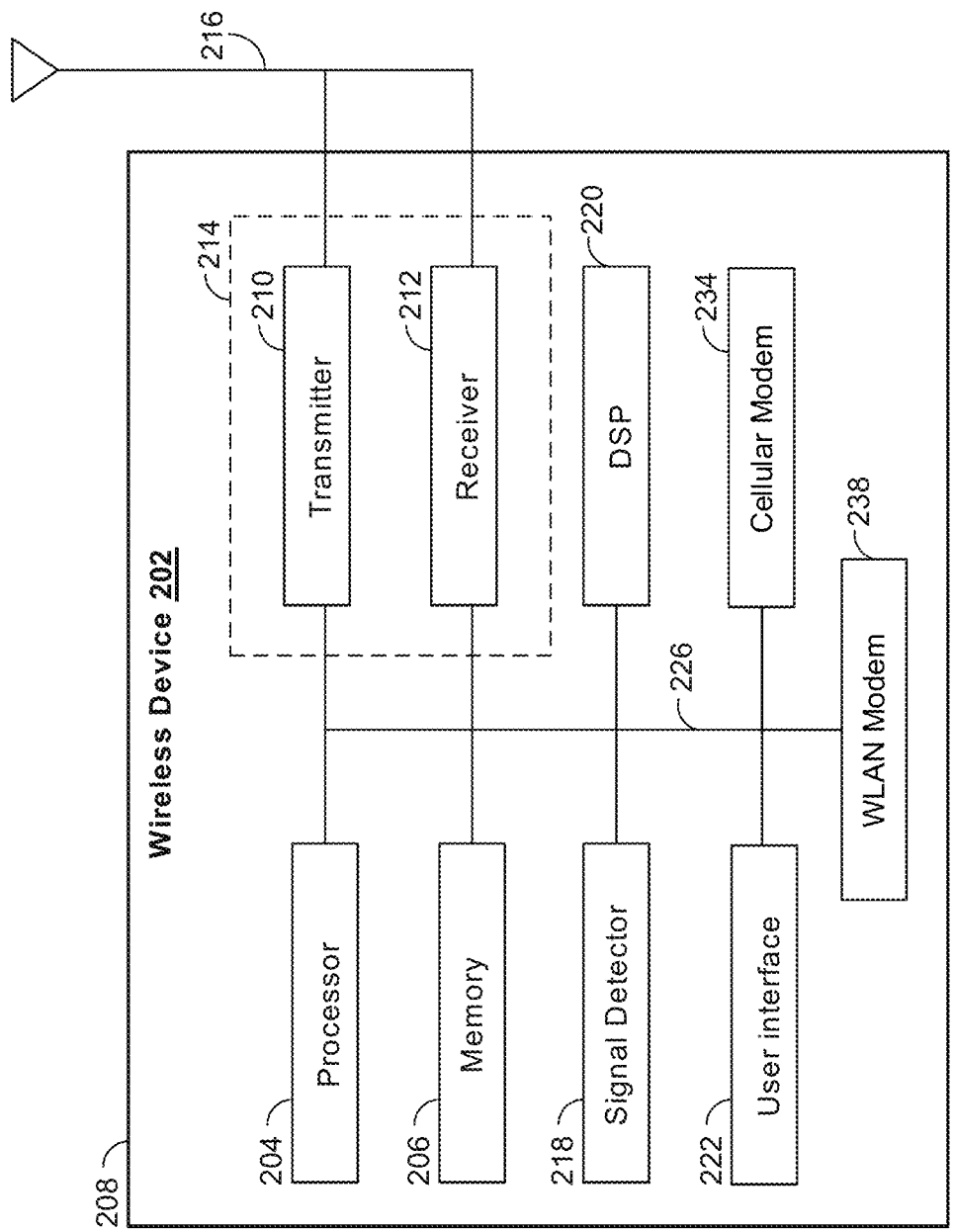
FIG. 2 schematically illustrates an example wireless device that may be employed within the example wireless communication system of FIG. 1.

FIG. 2 illustrates various components that may be utilized in a wireless device 202 that may be employed within the wireless communication MIMO system 100. The wireless device 202 is an example of a device that may be configured to implement the various methods described herein. The wireless device 202 may implement an AP 104 or a STA 106.

The wireless device 202 may include an electronic hardware processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more electronic hardware processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transceiver antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. In some aspects, the wireless device may also include one or more of a user interface component 222, cellular modem 234, and a wireless LAN (WLAN) modem. The cellular modem 234 may provide for communication using cellular technologies, such as CDMA, GPRS, GSM, UTMS, or other cellular networking technology. The modem 238 may provide for communications using one or more WiFi technologies, such as any of the IEEE 802.11 protocol standards.

The various components of the wireless device 202 may be coupled together by a bus system, which may include a power bus, a control signal bus, and a status signal bus in addition to a data bus.

Certain aspects of the present disclosure support transmitting an uplink (UL) signal or a downlink (DL) signal between one or more STAs and an AP. In some embodiments, the signals may be transmitted in a multi-user MIMO (MU-MIMO) system. Alternatively, the signals may be transmitted in a multi-user FDMA (MU-FDMA) or similar FDMA system. In some aspects, these signals may be transmitted over one or more of the transmitter 210 and the modem 238.

Figure 3:
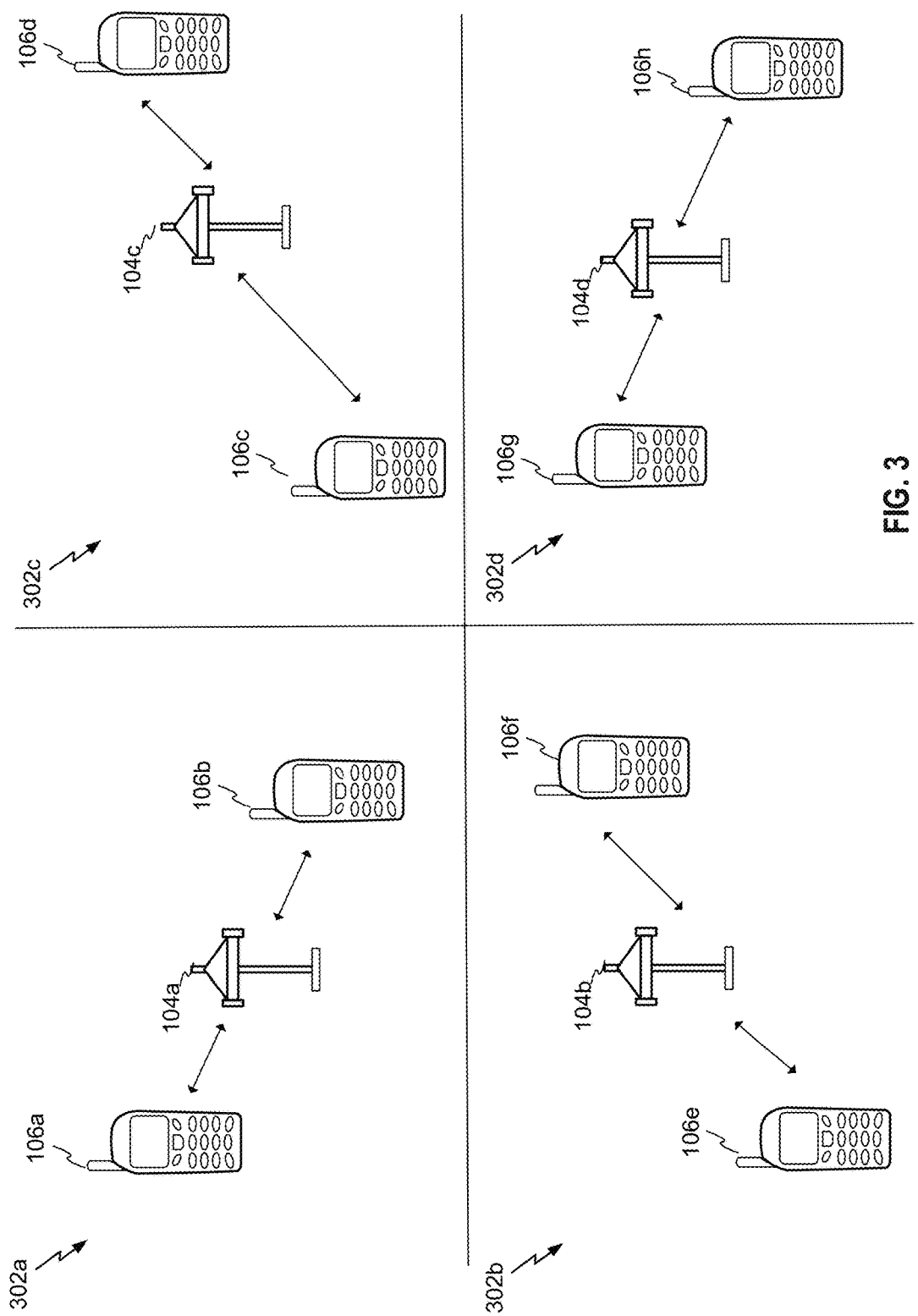
FIG. 3 schematically illustrates an example configuration of a distributed MIMO wireless communication system in accordance with certain embodiments described herein.

FIG. 3 shows four basic service sets (BSSs) 302a-d, each BSS including an access point 104a-d respectively. Each access point 104a-d is associated with at least two stations within its respective BSS 302a-d. AP 104a is associated with STA 106a-b. AP 104b is associated with STA 106e-f. AP 104c is associated with STA 106c-d. AP 104d is associated with STAs 106g-h. An AP that is associated with a STA may be referred to as a BSS AP for the STA throughout this disclosure. Similarly, an AP for which there is no association with a particular STA may be referred to as an OBSS AP for the STA throughout this disclosure. Associations between an AP and one or more stations provides for, in part, coordination of communication between devices within the basic service set (BSS) defined by the AP and its associated STAs. For example, devices within each BSS may exchange signals with each other. The signals may function to coordinate transmissions from the respective AP 104a-d and stations within the AP's BSS 302a-d.

The devices shown in FIG. 3, including the AP's 104a-d and STA 106a-h, also share a wireless medium. Sharing of the wireless medium is facilitated, in some aspects, via the use of carrier sense media access with collision detection (CSMA/CD). The disclosed embodiments may provide for a modified version of CSMA/CD that provides for an increase in an ability for the BSSs 302a-d to communicate simultaneously when compared to known systems.

The stations 106a-h within the BSSs 302a-d may have different abilities to receive transmissions from their associated AP based, at least in part, on their position relative to the other APs and/or stations outside their respective BSS (OBSS). For example, because the stations 106a, 106d, 106e, and 106h are positioned relatively far from OBSS APs, these stations may have an ability to receive transmissions from their BSS AP even with an OBSS AP or STA is transmitting. Stations having such receive characteristics may be referred to as Reuse STAs throughout this disclosure.

In contrast, STAs 106b, 106c, 106f, and 106g are illustrated in positions that are relatively close to an OBSS AP. Thus, these stations may have less ability to receive transmissions from their BSS AP during transmissions from OBSS AP's and/or OBSS STAs. Stations having such receive characteristics may be referred to as non-reuse or edge STAs throughout this disclosure. In some aspects, the disclosed methods and systems may provide for an improved ability for the non-reuse STAs to communicate concurrently while other OBSS devices are also communicating on the wireless medium.

In at least some of the disclosed aspects, two or more of the APs 104a-d may negotiate to form a cluster of access points. In other aspects, cluster configurations may be defined via manual configuration. For example, each AP may maintain configuration parameters indicating whether the AP is part of one or more cluster, and if so, a cluster identifier for the cluster. In some aspects, the configuration may also indicate whether the AP is a cluster controller for the cluster. In some of the embodiment disclosed herein, a cluster controller may take on functions that differ from APs that are part of the cluster but are not a cluster controller. Thus, in some aspects, two or more of APs 104a-d may be included in the same cluster. STAs associated with those access points may also be considered to be included in or part of the cluster of their associated AP. Therefore, in some aspects the STAs a-h illustrated above may be part of the same cluster.

The cluster of access points may coordinate transmissions between themselves and their associated APs. In some aspects, the cluster may be identified via a cluster identifier that uniquely identifies the group of access points comprising the cluster. In some aspects, during association of a station with any of the APs in a cluster, the cluster identifier is transmitted to the station during association, for example, in an association response message. The station may then utilize the cluster identifier to coordinate communications within the cluster. For example, one or more messages transmitted over the wireless network may include the cluster identifier, which a receiving STA may use to determine whether the message is addressed to it or not.

Embodiments that cluster of access points may also utilize various methods to identify STAs within the cluster. For example, as known methods of generating association identifiers (AIDs) may not provide uniqueness across access points, in some aspects, media access control (MAC) addresses may be utilized to identify stations where appropriate. For example, known messages including user info fields that utilize association identifiers to identify stations may be modified to contain data derived from station MAC addresses in the disclosed embodiments. Alternatively, methods of generating association identifiers may be modified to ensure uniqueness within a cluster of access points. For example, a portion of the association identifier may uniquely identify an access point within the cluster. Stations associated with that access point would be assigned association identifiers including the unique identification. This provides unique association identifiers across access points within a cluster. In some other aspects, an association identifier within a cluster may include the cluster identifier. This may provide for uniqueness across clusters to facilitate future cross-cluster coordination of communication.

Figure 4:
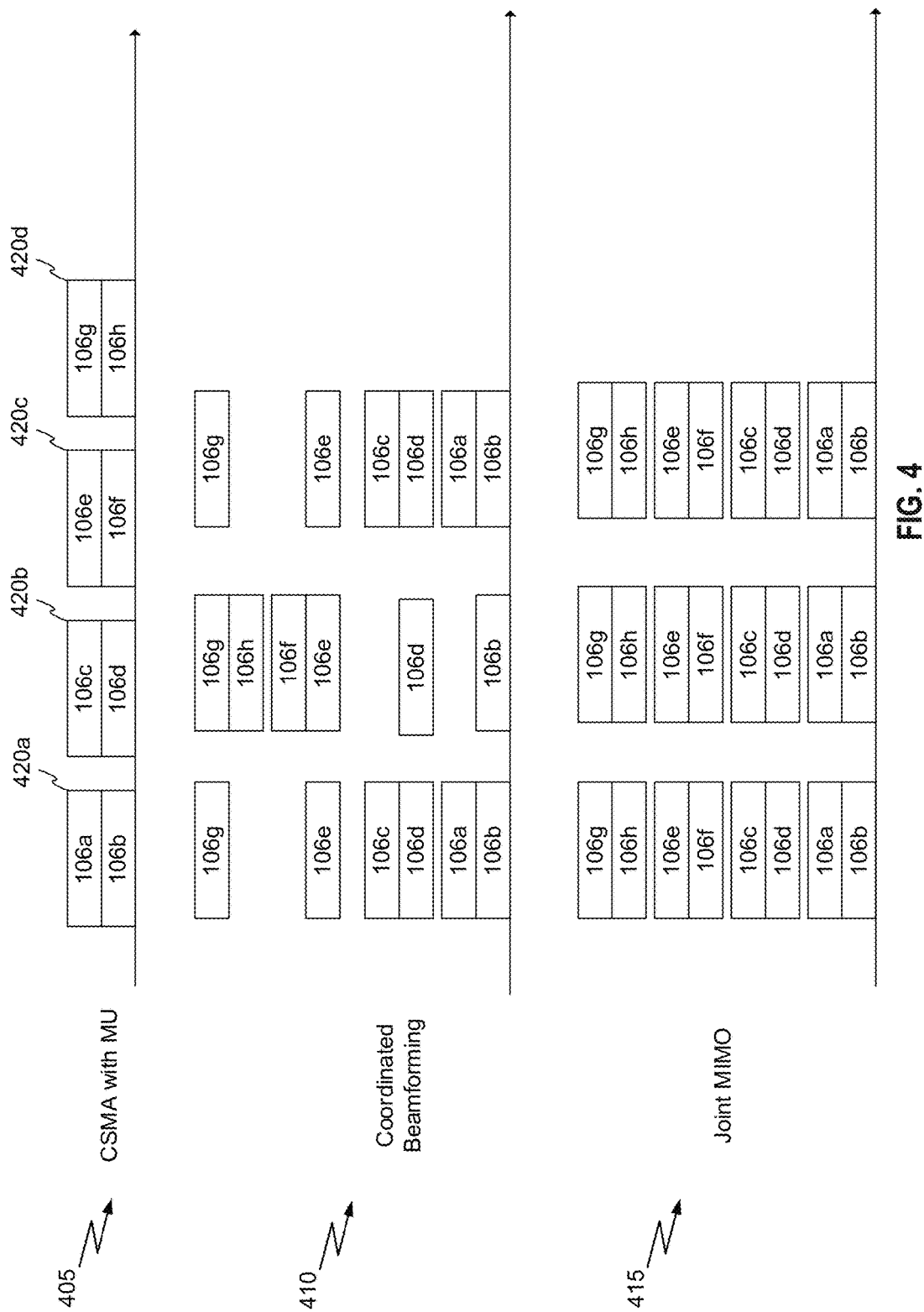
FIG. 4 schematically illustrates example communication options compatible with a distributed MIMO wireless communication system in accordance with certain embodiments described herein.

FIG. 4 shows three exemplary approaches to arbitrating the wireless medium with the communications system 300 of FIG. 3. Approach 405 utilizes carrier sense media access (CSMA) to perform single BSS multi-user transmissions. For example, each of transmissions 420a-d may be performed by the BSSs 302a-d of FIG. 3 respectively. The use of traditional CSMA in approach 405 causes the medium to be utilized by only one BSS at any point in time.

Approach 410 utilizes coordinated beamforming. With the coordinated beamforming approach 410, the APs 104a-d may coordinate transmissions between their respective BSSs. In some aspects, this coordination may be performed over the wireless medium, or in some aspects, over a back-haul network. In these aspects, the coordination traffic over the backhaul network provided for improved utilization of the wireless medium.

With this approach, reuse STAs for different BSSs may be scheduled to transmit or receive data concurrently. For example, a relative strength of a communication channel between STA 106*a* and AP 104*a* may allow these two devices to exchange data simultaneously with communication with OBSS devices, such as, for example, AP 104*b* and STA 106*d*. In addition, approach 410 may provide for non-reuse STAs to be scheduled to transmit concurrently with OBSS devices. For example, STA 106*b*, which is within BSS 302*a*, may be scheduled to communicate simultaneously with communication between AP 104*d* and STA 106*h*, which are both within BSS 302*d*. Such simultaneous communication between a non-reuse STA (such as STA 106*b*) and, for example, AP 104*d* may be facilitated by scheduling AP 104*d* to transmit a signal to STA 106*b* simultaneously with AP 104*d*'s transmission to STA 106*h*. For example, AP 104*d* may transmit a null signal for dominant interfering signals to STA 106*b*. Thus, while transmitting a first signal to STA 106*h*, AP 104*d* may simultaneously transmit a signal nulling the first signal to STA 106*b*. Such simultaneous transmission by the AP 104*d* may be provided by selecting individual antenna(s) of a plurality of antennas provided by AP 104*d* for each of the transmissions.

Approach 415 shows an exemplary joint multi-user communication or a distributed MIMO communication across access points 104*a-d* within the BSSs 302*a-d*. With this joint MIMO approach 415, a cluster of APs (such as APs 104*a-d*) may service N 1-SS STAs simultaneously, where N is ~¾ of a total number of antennas across all APs within the cluster, and where SS is spatial stream. In simplified terms, a spatial stream may correspond to a fraction of a number of antennas belonging to an AP. As one example, an AP with four antennas may: use one spatial stream to serve a first STA with a single antenna, use two spatial streams to serve a second STA with two antennas. As another example, the AP may use one antenna for "null" and two antennas to serve one or more STAs. It should be understood that these are not exhaustive examples, that the AP could have different numbers of antennas, and that the AP could serve one or more STAs via different numbers of antenna combinations, for example, based on the antenna combinations of the STAs.

It should be further understood that these concepts may be extended to a cluster of APs, for example, a group of APs belonging to a cluster that together (e.g., cumulatively) have a particular number of antennas, K. In this example the group of APs may provide a particular fraction of K streams (e.g., ¾ of K). As one non-limiting example, four (4) APs cumulatively having sixteen (16) antennas may provide twelve (12) spatial streams (SS). In an aspect, the APs in this example may provide "up to" twelve (12) spatial streams. Further in this example, the twelve (12) streams may service four (4) reusable 1-SS STAs, four (4) 1-SS non-reusable STAs, and null those four (4) non-reusable STAs. In another non-limiting example, the sixteen (16) antennas may service six (6) reusable 2-SS STAs. It should be understood that these are not exhaustive examples and that the cluster of APs, in some aspects, may cumulatively have a different number of antennas which may be used to service or null a different number of STAs. The examples illustrated herein consider ¾ as a technically advantageous combination for SS to a number of antennas ratio. Still, other fractional combinations may be possible or suitable based on different system and/or environmental conditions.

Thus, to accomplish the arbitration approach 415, at least two access points within a cluster, for example, APs 104*a* and 104*b* of FIG. 3 may transmit to at least one station associated with one of the access points simultaneously. For example, joint MIMO or distributed MIMO may include APs 104*a* and 104*b* transmitting simultaneously to STA 106*a*. Distributed MIMO communications may coordinate a collection of antennas across the multiple APs within a cluster to transmit to stations within the cluster. Thus, while traditional MIMO methods allocate transmit antennas within a single BSS to stations within the BSS, distributed MIMO provides for allocation of transmit antennas outside a BSS to facilitate communications with stations within the BSS.

In a distributed MIMO communication, a station in one BSS may communicate with one or more access points in another, different BSS. Thus, for example, station 106*a* of BSS 302*a* of FIG. 3 may communication with access point 104*d*, which is in BSS 302*d*. This communication may occur simultaneously with communication between STA 106*a* and AP 104*a*, the BSS AP of the STA 106*a*. In some aspects of an uplink distributed MIMO communication, the STA 106*a* may conduct one or more uplink communications to AP 104*a* simultaneously with AP 104*d*. Alternatively, a downlink distributed MIMO communication may include AP 104*a* transmitting data to STA 106*a* simultaneously with a transmission from AP 104*d* to STA 106*a*.

Thus, one or more of the distributed embodiments may utilize MIMO in the form of Cooperative Multipoint (CoMP, also referred to as e.g. Network MIMO (N-MIMO), Distributed MIMO (D-MIMO), or Cooperative MIMO (Co-MIMO), etc) transmission, in which multiple access points maintaining multiple corresponding basic service sets, can conduct respective cooperative or joint communications with one or more STAs 106. CoMP communication between STAs and APs can utilize for example, a joint processing scheme, in which an access point associated with a station (a BSS AP) and an access point that is unassociated (or "not associated") with a station (a OBSS AP) cooperate to engage in transmitting downlink data to the STA and/or jointly receiving uplink data from the STA. As described herein, a first wireless device (e.g., an access point) may be considered as unassociated, or not associated, with a second wireless device (e.g., a station) if the first wireless device is a member of, or has, a first basic service set (BSS) and the second wireless device is a member of, or has, a second basic service set (BSS) that is different from the first basic service set. Additionally or alternatively, CoMP communication between an STA and multiple access points can utilize coordinated beamforming, in which a BSS AP and an OBSS AP can cooperate such that an OBSS AP forms a spatial beam for transmission away from the BSS AP and, in some aspects, at least a portion of its associated stations, thereby enabling the BSS AP to communicate with one or more of its associated stations with reduced interference.

To facilitate the coordinated beamforming approach 410 or the joint MIMO approach 415, an understanding of channel conditional between an access point and OBSS devices may provide for greater wireless communication efficiency.

In some aspects, devices transmitting the wireless communications described herein (e.g., distributed MIMO communications) may utilize various data and coding techniques to improve the security and/or the robustness for the communications. For example, a downlink distributed MIMO communication may be transmitted from the AP 104*a* to the station 106*a* simultaneously with a transmission from the AP 104*d* to the station 106*a*. The source data included in one or more of the communications may be encoded, for example, into a plurality of symbols. As one having ordinary skill in the art will appreciate, a data and coding scheme may utilize, for example, fountain codes, raptor codes, etc. The receiving device (e.g., the station 106*a*) may recover the encoded data by decoding the plurality of symbols or a subset of the plurality of symbols and then formatting the decoded data into a plurality of data units. In some aspects, the transmitting devices and the receiving device may comprise any of the other wireless devices described herein. For example, the receiving device in this example may be the AP 104*a*, while the transmitting devices in this example may be neighboring APs (e.g., AP 104*b* and AP 104*c*). Other examples are described herein in connection with FIGS. 7-10.

FIG. 5 schematically illustrates a plurality of basic service sets (BSSs) 500 of an exemplary distributed MIMO wireless communication system. Each hexagon of FIG. 5 represents an access point and associated stations, collectively referred to as a basic service set (BSS). The individual BSSs are grouped into clusters in accordance with certain embodiments described herein. In the example schematically illustrated by FIG. 5, a first cluster (C1) comprises four BSSs, a second cluster (C2) comprises four BSSs, and a third cluster (C3) comprises four BSSs. In certain other embodiments, a cluster can comprise 2, 3, 4, 5, or any numbers of BSSs and a wireless communication system can comprise one or more clusters (e.g., 2, 3, 4, 5 or other numbers of clusters).

In certain embodiments, to perform distributed MIMO communications, devices within two or more BSSs of a cluster may transmit over a single channel simultaneously (e.g., transmit data from a plurality of access points of the BSS simultaneously via the single channel, or transmit data from a plurality of stations in different BSSs simultaneously to a single AP). In some aspects, a centralized scheduler (not shown) may coordinate transmissions across the clusters C1-C3. For example, coordination may include selecting which devices will transmit simultaneously from multiple BSSs to perform a joint MIMO communication.

The systems and methods described herein for enabling neighboring APs to coordinate simultaneous transmissions to multiple stations within and outside their basic service sets provide certain technical benefits. As one non-limiting example, the systems and methods described herein may improve overall system throughput, for example, by servicing an increased number of stations without requiring additional time (e.g., by more efficiently using the wireless spectrum, as described below). As another non-limiting example, when a station transmits duplicate and/or encoded data to the APs in the network, the systems and methods for transmission described herein may improve spatial diversity and data reliability, for example, as compared with transmitting one or more "null signals" to unassociated APs in the network.

Under European Telecommunications Standard Institute (ETSI) regulations, wireless communication systems are generally required to utilize clear channel assessment (CCA) or listen-before-talk (LBT) before allowing access to the wireless network. Generally, two different access modes are allowed in such wireless communication systems: "frame-based" access mode and "load-based" access mode. To utilize coordinated access in an unlicensed spectrum, it is generally desirable for a device on the wireless network to use a safe or allowed mechanism for ignoring same-network deferral while honoring LBT toward other devices on the wireless network. A similar issue arises with licensed assisted access (LAA) systems, which are bound to a fixed frame structure. However, in wireless communication systems which are not bound to a fixed frame structure (e.g., WiFi), a more flexible and/or efficient solution may be used. Certain embodiments described herein advantageously provide a way to enable reuse (e.g., stations able to serve simultaneously without having to be nulled) by synchronizing the physical layer convergence procedure (PLCP) protocol data unit (PPDU) start time, which may be seen as a forced collision. In certain such embodiments, the timing scheme is configured so that energy detect (ED) or power detect (PD) operations do not trigger within the same wireless network at the start of a frame (e.g., having a standard that defines requirements for CCA timing and synchronization).

Figure 6A:
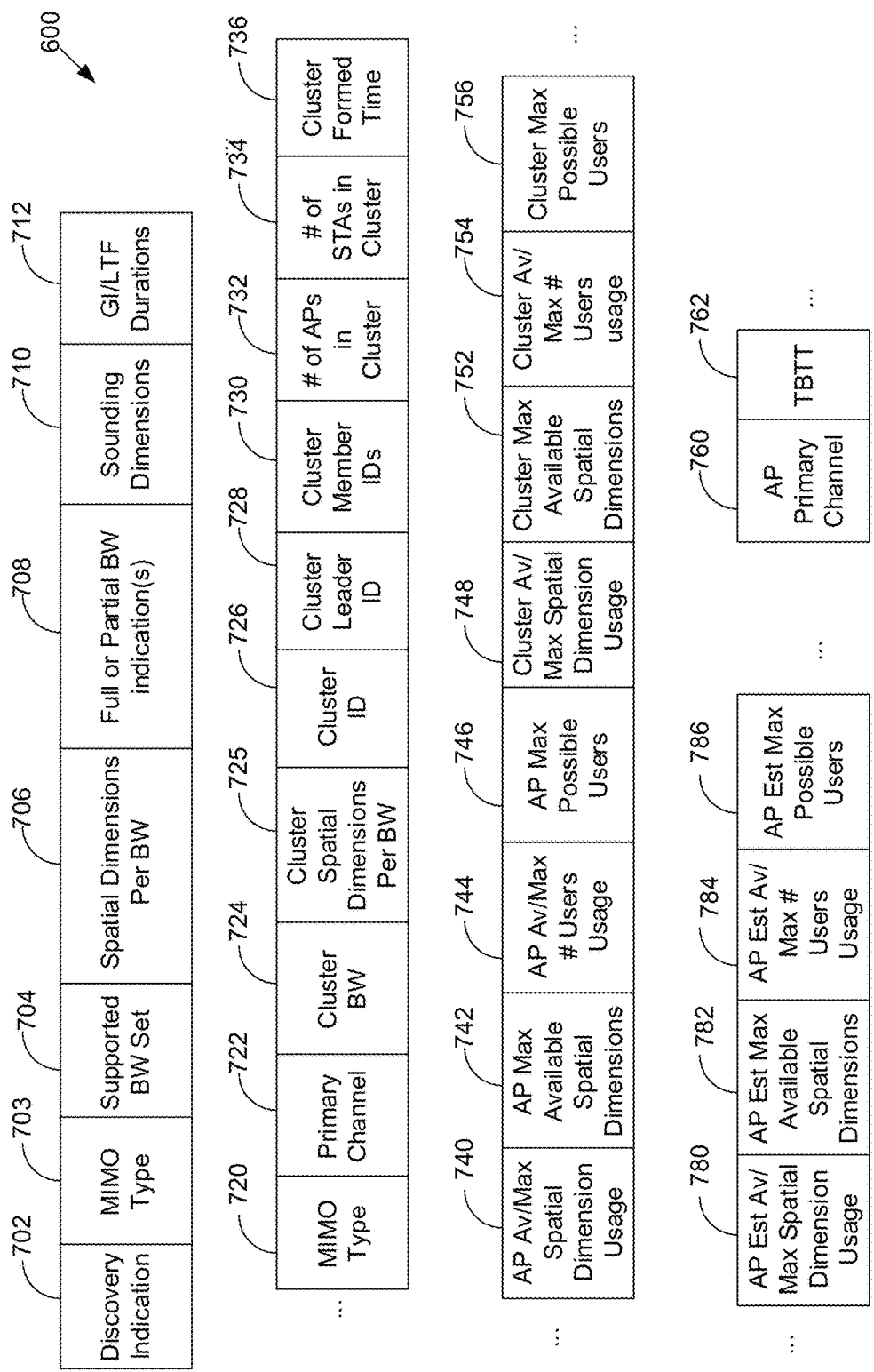
FIG. 6A is an exemplary message format for an access point discovery message.

FIG. 6A is an exemplary message format for an access point discovery message. The discovery message 600 may be transmitted by an access point, such as the access point 104 discussed earlier with respect to FIG. 1. Other embodiments of an access point discovery message may include fewer fields than those shown in FIG. 6A. Various aspects of an access point discovery message may include one or more of the illustrated fields in FIG. 6A.

The exemplary discovery message 600 includes a discovery indication 702, an indication of supported distributed MIMO type field 703, supported bandwidth (BW) set field 704, a maximum supported spatial dimensions per supported bandwidth field 706, an indication of supporting full or partial bandwidth per supported bandwidth field 710, a maximum supported sounding dimensions field 710, and an indication of supported guard interval and long training field durations field 712.

Some aspects of discovery message 600 may include one or more of a cluster's distributed MIMO type field 720, cluster's primary channel field 722, cluster bandwidth field 724, cluster spatial dimensions field 725, cluster identifier field 726, cluster leader identifier field 728, and cluster member identifier(s) field 730.

Some aspects of the discovery message 600 may include one or more of a number of APs in cluster field 732, a number of STAs in cluster field 734, and a cluster formation time field 736.

The discovery indication field 702 indicates, for example, via one or more predetermined values, that the message 600 is an access point discovery message. In some aspects, the discovery indication field 702 may include non-contiguous bits in the message. For example, in some aspects, a combination of a media access control type field and subtype field (not shown in FIG. 6A), along with zero or more bits in other fields, may be included in the discovery indication field 702. The MIMO type field 703 indicates one or more types of distributed MIMO communication supported by the device transmitting the message 600. The MIMO type field 703 may indicate the transmitting device supports one or more of downlink (DL) and/or uplink (UL) coordinated beamforming and downlink (DL) and/or uplink (UL) joint MIMO (for a total of four (4) possible types supported), The supported bandwidth set field 704 may indicate, for example, via one or more predetermined values, one or more bandwidth sets supported by an access point transmitting the discovery message 600 ("transmitting access point"). In some aspects, predefined indexes may correspond to corresponding predefined bandwidth sets. The field 704 may indicate indexes of the one or more sets in some aspects.

The spatial dimensions per bandwidth field 706 may indicate, for example, via one or more predetermined values, a number of spatial dimensions supported for each of the supported bandwidth sets indicated in the field 704. The full or partial bandwidth indication(s) field 708 may indicate, for example, via one or more predetermined values, whether the access point transmitting the message 600 supports operation within the full bandwidth indicated in field 704 or only a portion of the indicated bandwidth. Separate full or partial indications may be provided in field 708 for each bandwidth set indicated in field 704. The sounding dimensions field 710 may indicate a number of how many streams may be sounded by the access point. The GI/LTF durations field 712 may indicate durations for guard intervals and/or long training fields supported by the access point transmitting the message 600.

The cluster's distributed MIMO type field 720 may indicate the type that the cluster is operating on. In some aspects, the cluster's distributed MIMO type field may indicate whether the cluster supports one or more of downlink coordinated beamforming, uplink coordinated beamforming, downlink joint MIMO, and/or uplink joint MIMO. The cluster's primary channel field 722 may indicate, for example, via one or more predetermined values, the cluster's primary channel. The cluster bandwidth field 724 may indicate, for example, via one or more predetermined values, one or more bandwidths supported by a cluster that the transmitting access point is a member of. The cluster spatial dimensions per bandwidth field may indicate, for example, via one or more predetermined values, a number of spatial dimensions supported for each of the supported bandwidth sets indicated in the field 724. The cluster identifier field 726 may indicate a unique identifier for a cluster of which the transmitting member is a member. In some aspects, the cluster identifier may be a BSSID of a leader access point for the cluster. The cluster leader identifier 728 may indicate a unique identifier for an access point that is designated as a leader of the cluster of which the transmitting access point is a member. The cluster leader id 728 may be, in some aspects, a BSSID of the cluster leader. The cluster member IDs field 730 may indicate one or more identifiers for non-leader access points that are members of the cluster of which the transmitting access point is a member. In some aspects, the member identifiers are BSSIDs of the non-leader access points.

The number of access points in cluster field 732 indicates a number of access points that are members of a cluster which includes the transmitting access point. The number of stations in cluster field 734 indicates a number of stations that are associated with access points that are members of a cluster which includes the transmitting access point. The cluster formed time field 736 indicates an amount of time since a cluster of which the transmitting access point is a member was formed.

In some aspects, the discovery message 600 may include data describing one or more characteristics of an access point transmitting the discovery message 600. This information may be beneficial to a receiving device when determining whether to collaborate with the device transmitting the message 600. The message may be generated to include one or more of access point average and/or maximum usage of spatial dimensions field 740, maximum available spatial dimensions of the access point field 742, average and/or maximum number of users using the access point field 744, maximum possible users supported by the access point field 746. In some aspects, each of the fields 740-746 may provide separate data for uplink and downlink MU-MIMO. In some aspects, one or more of the fields 740-746 may be used by a receiving access point to determine whether the receiving access point will form a downlink and/or uplink coordinated beamforming cluster with the access point transmitting the message 600. For example, if a receiving device determines that the transmitting access point has underutilized dimensions in either downlink and/or uplink MU-MIMO, it may be desirable to form a coordinated beamforming cluster with the access point to better utilize those spatial dimensions.

Some aspects of the message 600 may include information relating to usage of a cluster in which the transmitting access point is participating. This information may include one or more of an average and/or maximum usage of spatial dimensions of the cluster field 748, maximum available spatial dimensions of the cluster field 752, average and/or maximum number of users using the cluster field 754, and a maximum possible number of users for the cluster field 756. In some aspects, one or more of the fields 748-756 may include separate information for uplink and/or downlink coordinated beamforming. Some aspects of the fields 748-756 may include separate information for uplink and/or downlink Joint MIMO. Thus, in various aspects, one or more of the fields 748-756 may include between one and four separate metrics. In some aspects, one or more of the fields 748-756 may be utilized to determine whether an access point receiving the message 600 will join the cluster in which the transmitting access point is participating.

Some aspects of the message 600 may include one or more of an AP primary channel field 760 and a target beacon transmission time (TBTT) field 762. The TBTT field may indicate a time when an access point transmitting the message 600 will transmit a beacon.

In some aspects, fields 740-746 may be only included in the message 600 when an AP transmitting the message 600 is in single BSS MU-MIMO operation. In some aspects, fields 748-756 may only be included in the message 600 when the AP is part of a cluster.

Some aspects of message 600 may include estimates for an AP participating in a cluster. The estimates may estimate the APs usage if it was operating without the cluster. Various aspects of message 600 may be generated to include one or more of an estimated average and/or maximum spatial dimension usage of the AP field 780, an estimated maximum available spatial dimensions for the AP field 782, an estimated average and/or maximum number of users using the AP field 784, and an estimated maximum number of users supported by the AP field 786. In some aspects, one or more of the fields 780-786 may be utilized by a receiving access point to determine whether it will leave a cluster. In some cases, collaboration overhead associated with participating in a cluster may exceed benefits of the cluster if the cluster is heavily utilized.

The discovery message 600 may be transmitted over an operating channel of an access point. In other words, the discovery message 600 may be transmitted over a channel that is also used for uplink and/or downlink communication between the access point and its associated stations. Alternatively, the discovery message 600 may be transmitted over a common channel, in some aspects, a channel that is different than a channel used for data communication between the transmitting access point and its associated stations.

Figure 6B:
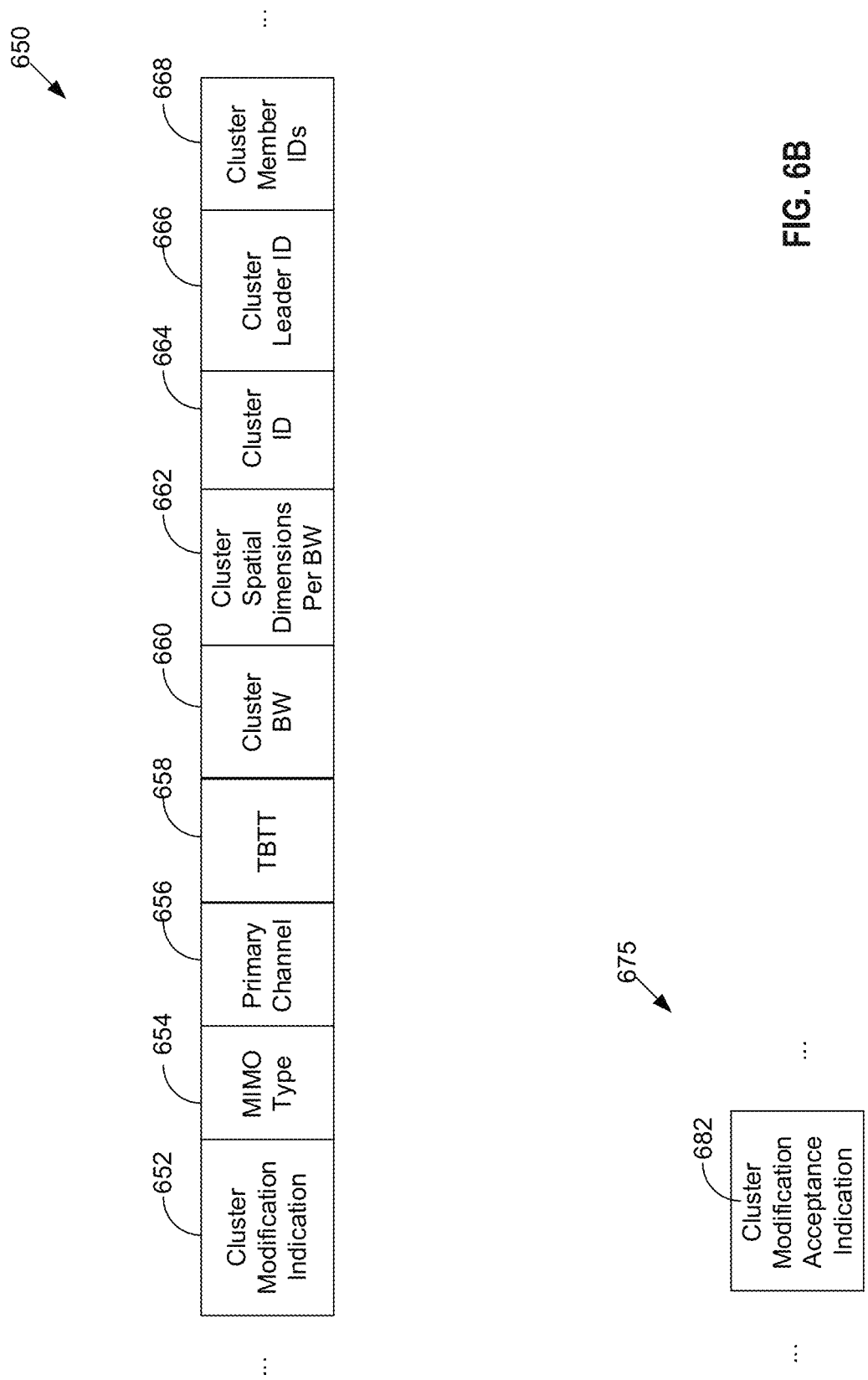
FIG. 6B is an exemplary message format for messages exchanged between two access points that may participate in a common cluster.

FIG. 6B is an exemplary message format for messages exchanged between two access points that may participate in a common cluster. FIG. 6B shows a message 650 that may be utilized to request participation in a cluster. The message 650 may request participation by, in some aspects, requesting modification of a cluster configuration for one or more access points. The message 650 may be transmitted from a first access point to a second access point. The message 650 may include one or more of the fields shown in FIG. 6B. The message 650 may include one or more of a cluster modification field 652, a MIMO type indication 654, a primary channel field 656, a target beacon transmission time field (TBTT) 658, a cluster bandwidth field 660, a cluster spatial dimensions per bandwidth field 662, a cluster identifier field 664, a cluster leader id field 666, and one or more cluster member identifier(s) field 668. The fields 654, 656, 660, 662,

665, 666, and 668 may carry information similar to that described above with respect to fields 720, 722, 724, 725, 726, 728, and 730 respectively.

The message 650 may be transmitted from a first access point to a second access point to request that the two access points either form a new cluster, merge existing clusters, or for the first access point to join a cluster of the second access point. These different types of requests may be indicated, via predetermined values, in the cluster modification notification field 652. The fields 654-668 may indicate proposed values after the modification. Thus, when sending the message 650, the first access point may propose, for example, a primary channel for a newly formed or merged cluster as indicated by the field 656.

In response to the message 650, a receiving device may transmit a message 675. The message 675 may indicate whether the receiving device accepts the participation requested by the message 650. In some aspects, the message 675 may include at least a cluster modification acceptance indication field 682. The field 682 may indicate, via two or more predetermined values for accept and not accept respectively, whether the receiving device accepts the request indicated by the message 650. In some aspects, the message 675 may include one or more of the fields 654-668. When one or more of these fields are included in the message 675, the fields may indicate operative values for a cluster resulting from the exchange of messages 650 and 675. For example, message 650 may be transmitted from a first access point to a second access point, requesting that the first access point join a cluster of the second access point. The message 650 may further propose that a first primary channel be used by the cluster, via the primary channel field 656. The message 675 may indicate the request for the first access point to join is accepted (for example, via the field 682), but that the primary channel is a second channel (via, for example, the field 656) included in the message 682 in this example embodiment.

Figure 7:
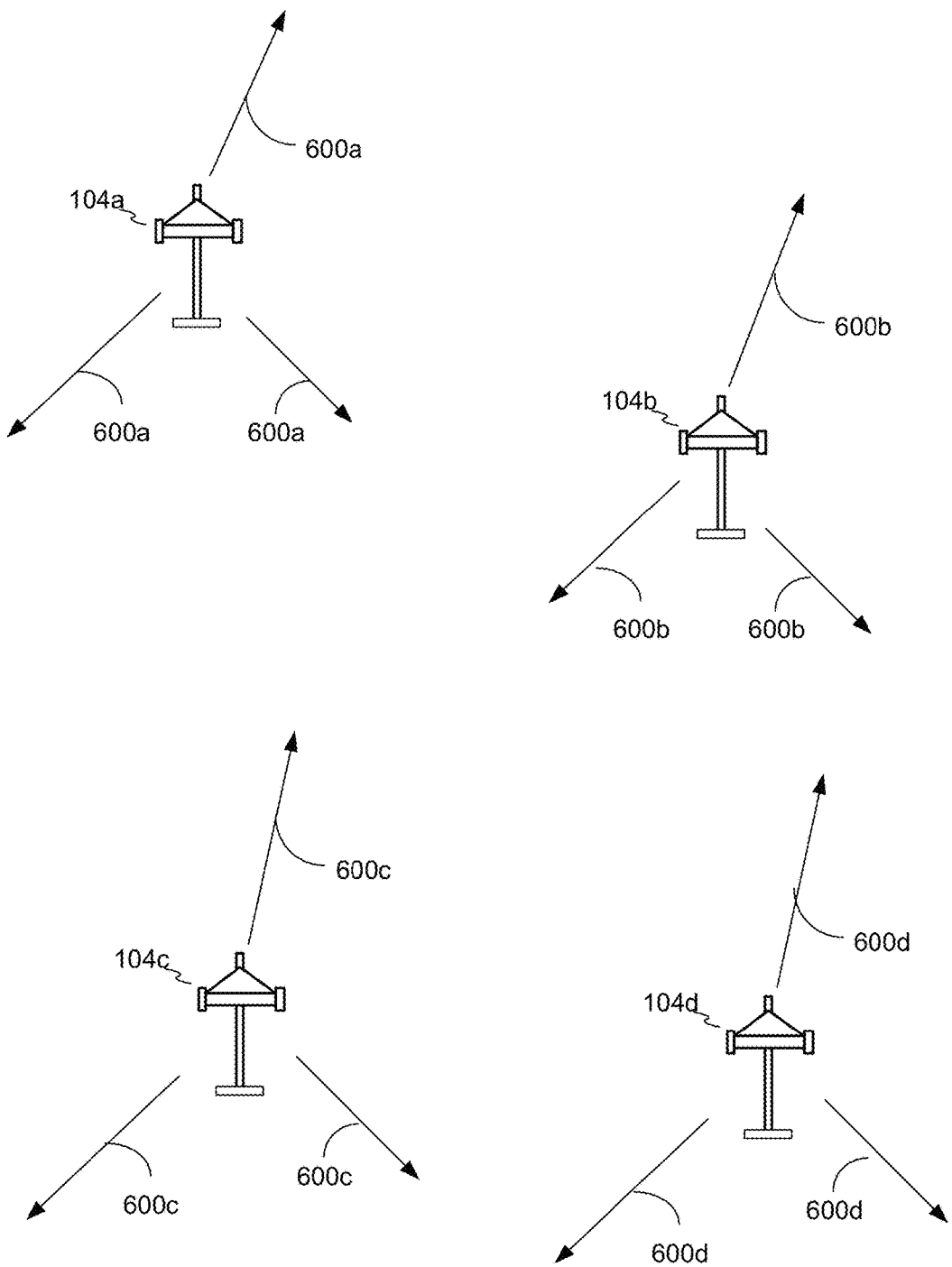
FIG. 7 shows an exemplary access point discovery mechanism.

FIG. 7 shows an exemplary access point discovery mechanism. FIG. 7 shows four access points 104a-d. Each access point transmits discovery messages 600a-d. In some aspects, two or more of the access points 104a-d may have a common discovery time window across access points of the network. In some aspects, the discovery time window provides a recurring time period during which access points transmit and receive discovery messages. In some aspects, dedicated channels may also be defined for discovery messages. For example, a dedicated channel may be provided in one or more of a 2.4 Ghz and/or 5 Gigahertz for discovery messages.

In some aspects, one or more of the APs 104a-d may receive one or more discovery messages from one or more of the other APs 104a-d over a common channel or disparate channels. For example, in some aspects, two or more of the APs 104a-d may transmit discovery messages over different channels. In these aspects, each AP may scan across multiple channels and listen for discovery messages. For example, an AP may tune a receiver to a first channel, and listen for a period of time for discovery messages. The AP may then tune the receiver to a different second channel and listen for discovery messages on that channel, etc. Some aspects may define a common channel used for discovery messages. In these aspects, each access point 104a-d may periodically tune its receiver to the common channel and listen for discovery messages, then tune its receiver to other channels to support communication with its associated (and potentially unassociated) stations.

Figure 8:
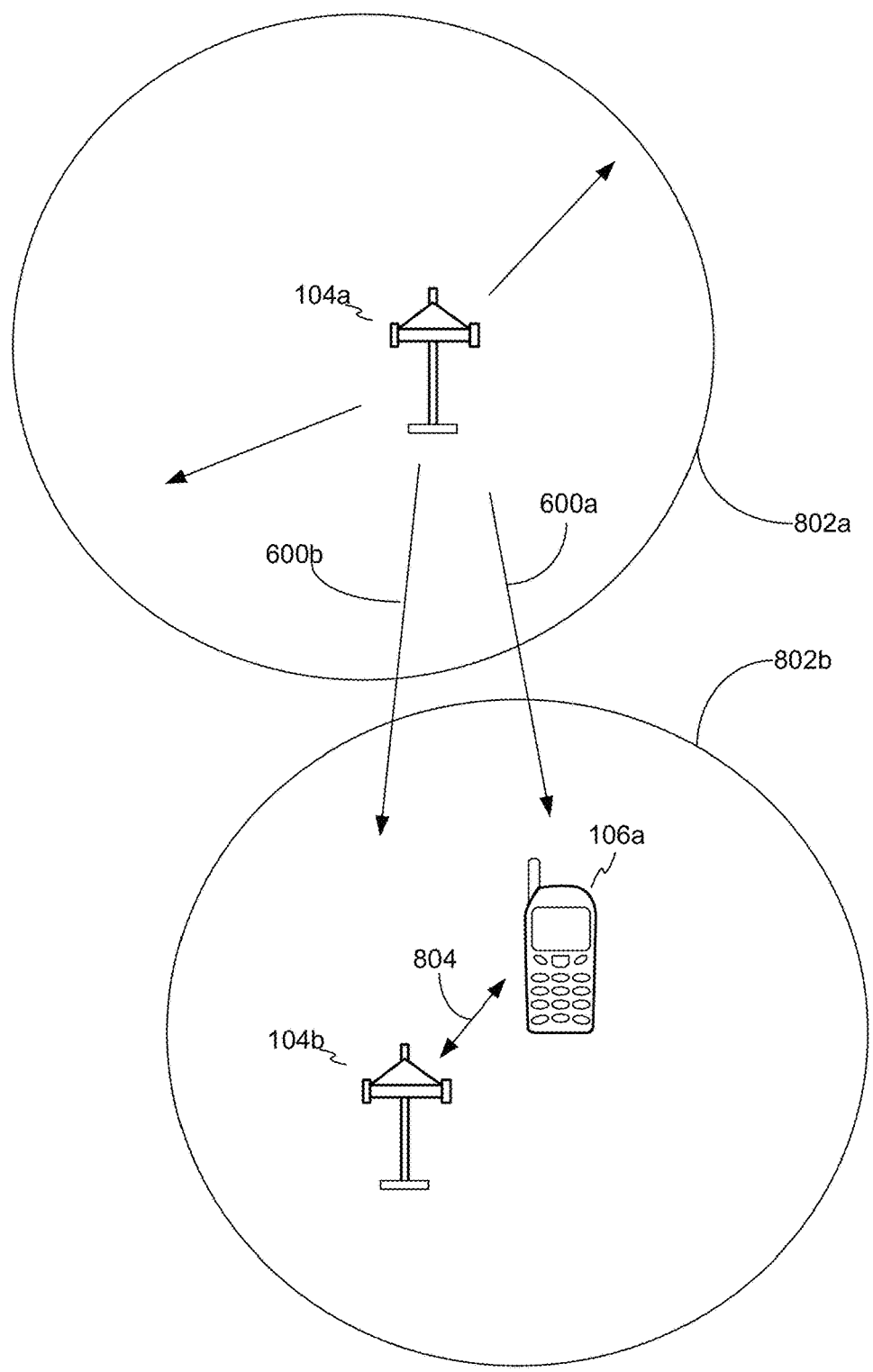
FIG. 8 shows an exemplary access point discovery method.

FIG. 8 illustrates an access point discovering a second access point via a station. FIG. 8 shows two access points 104a-b that are each maintaining a separate basic service set 802a-b respectively. A method of access point discovery illustrated by FIG. 8 shows the access point 104a transmitting a discovery message 600a. The discovery message 600a may be an embodiment of message 600 discussed above with respect to FIG. 6A. The discovery message 600a may be received by a station 106a. The station 106a may not be associated with the access point 104a, and thus may not be included in the BSS 802a, as shown in FIG. 8. Instead, the station 106a may be associated with the access point 104b, and thus be within the basic service set 802b. The station 106a may receive the discovery message 600a. In some cases, the access point 104b may not receive the discovery message 600a. For example, the station 106a may have its receiver tuned to a channel upon which the discovery message 600 is transmitted, while the AP 104b may not have its receiver tuned to the channel when the discovery message 600a is transmitted.

After receiving the discovery message 600a, the STA 106a may transmit a message 804 to the AP 104b, indicating one or more aspects of the discovery message 600a. For example, in some aspects, the message 804 may forward the message 600a to the AP 104b. For example, the message 804 may be transmitted over a channel used for communication between the AP 104b and the STA 106a, such that the AP 104b has a higher probability of receiving the message 804 than the message 600a. Upon receiving the message 804 from the STA 106a, the AP 104b may tune its receiver so as to better receive a second discovery message from the AP 104a, shown as 600b. Alternatively, the AP 104b may determine whether it will join a cluster with AP 104a based on contents of the message 804. For example, if the message 804 is a forwarded version of message 600a, then the message 804 may contain enough information for AP 104b to determine whether to join a cluster with AP 104a without a need for the AP 104b to tune its receiver so as to receive a discovery message directly from the AP 104a, such as discovery message 600b.

Figure 9:
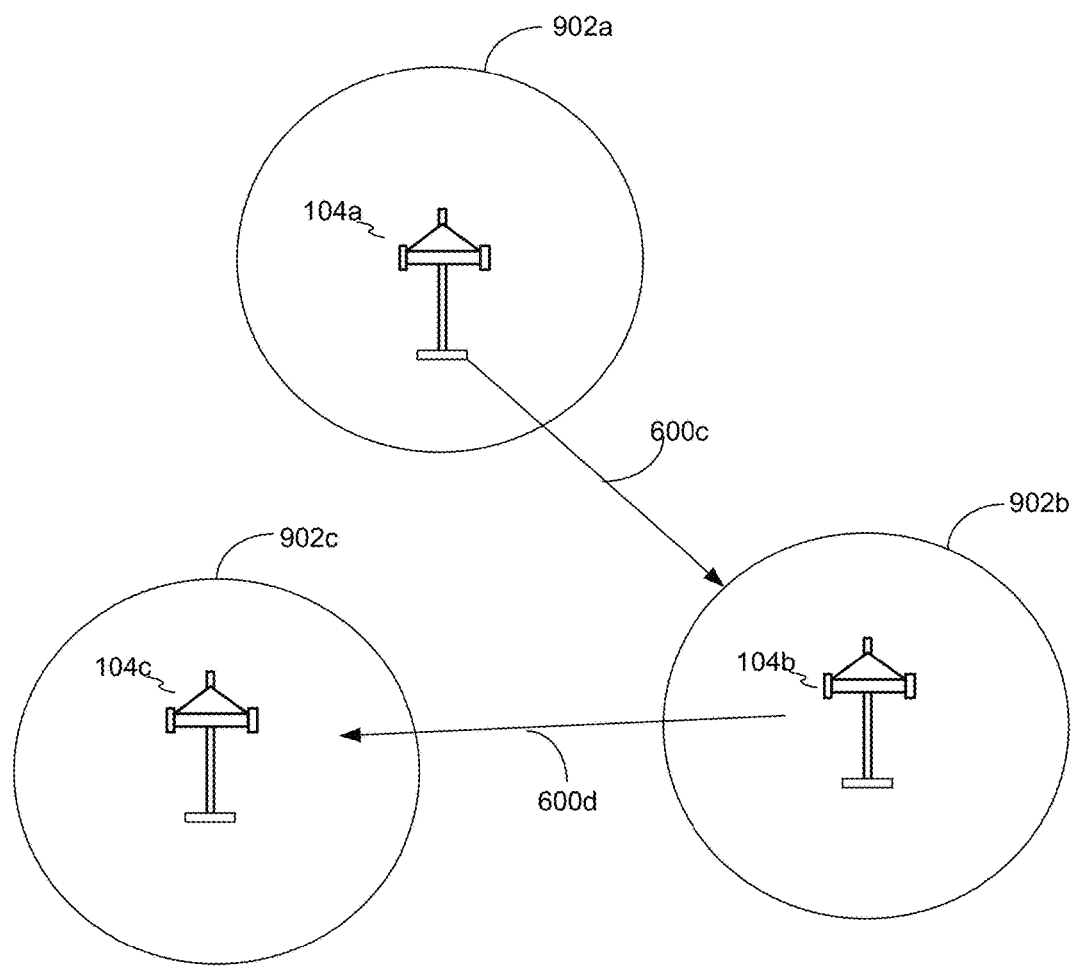
FIG. 9 shows an exemplary access point discovery method.

FIG. 9 shows an exemplary access point discovery method. FIG. 9 shows three access points 104a-c maintaining three respective basic service sets 902a-c. The AP 104a transmits a discovery message 600c. The discovery message 600c may be an embodiment of discovery message 600 discussed above with respect to FIG. 6A. The discovery message 600c may be received by the AP 104b but may not be received by the AP 104c. In some aspects, the AP 104c may be out of range of the AP 104a, and thus, the discovery message 600c may not be received by the AP 104c. In some other aspects, the AP 104c may not receive the discovery message 600c because the AP 104c may not have its receiver tuned to a channel used to transmit the discovery message 600c at the time the discovery message 600c is transmitted by the AP 104a. The AP 104b may have its receiver tuned appropriately so as to receive the discovery message 600c.

The AP 104b may be configured to forward the discovery message 600c as discovery message 600d. In some aspects, the AP 104b may transmit the discovery message 600d on a different channel than a channel upon which the AP 104b receives the discovery message 600c. In some aspects, the AP 104b may transmit the discovery message 600d at a different time interval than a second time interval at which the discovery message 600c is received. For example, the APs 104a-b may be included in a first neighbor aware network (NAN) or a NAN-like or type network, and the discovery message 600c may be received during a discovery window of the first neighbor aware network. The APs 104b-c may be include in a second neighbor aware network, with a different discovery window. The AP 104b may receive the message 600c during the discovery window for the first neighbor aware network and transmit the discovery message 600d during the discovery window for the second neighbor aware network. Upon receiving the discovery message 600d, the AP 104c may determine whether it will join a cluster with AP 104a. For example, in some aspects, the AP 104a may tune its receiver based on information included in the discovery message 600d, so as to receive a discovery message directly from the AP 104a. This may ensure the AP 104c is within a proper range of the AP 104a such that joining a cluster with the AP 104a is feasible.

Figure 10:
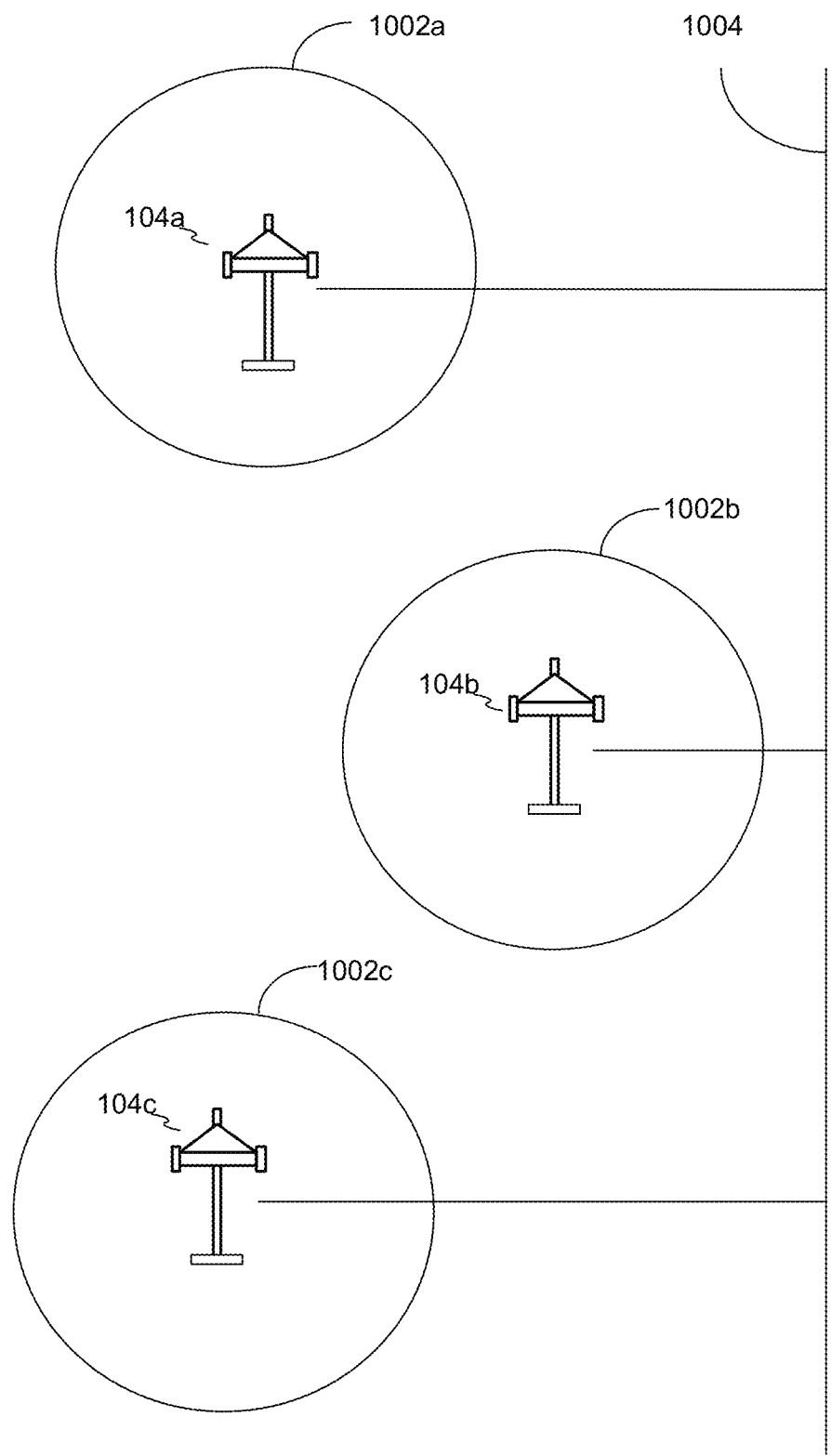
FIG. 10 shows an exemplary access point discovery method.

FIG. 10 shows an exemplary access point discovery method. FIG. 10 shows embodiments of the APs 104a-c and respective BSSs 1002a-c. Also shown in FIG. 10 is a back-haul network 1004. The back-haul network 1004 may be a wired network in some aspects. In some aspects, one of the APs 104a-c may play a role of a central controller. The central controller may include configuration information that provides indications of geographic locations of one or more of the APs 104a-c. This configuration information may be entered manually via a configuration user interface in some aspects. Alternatively, the configuration information may be determined dynamically via a configuration protocol. For example, each of the APs 104a-c may broadcast their geographic location over the back-haul network 1004 in some aspects.

The central controller may transmit discovery messages for other devices, such as one or more of the APs 104a-c, over the back-haul network 1004. Upon receiving a discovery message from the backhaul network 1004, an AP 104 may tune its receiver to a primary channel indicated in the discovery message. This may allow the AP 104 to verify whether an AP associated with the received discovery message is within range of the receiving AP 104. In some aspects, the central controller may not be one of the APs 104a-c, but may be a separate device.

Figure 11:
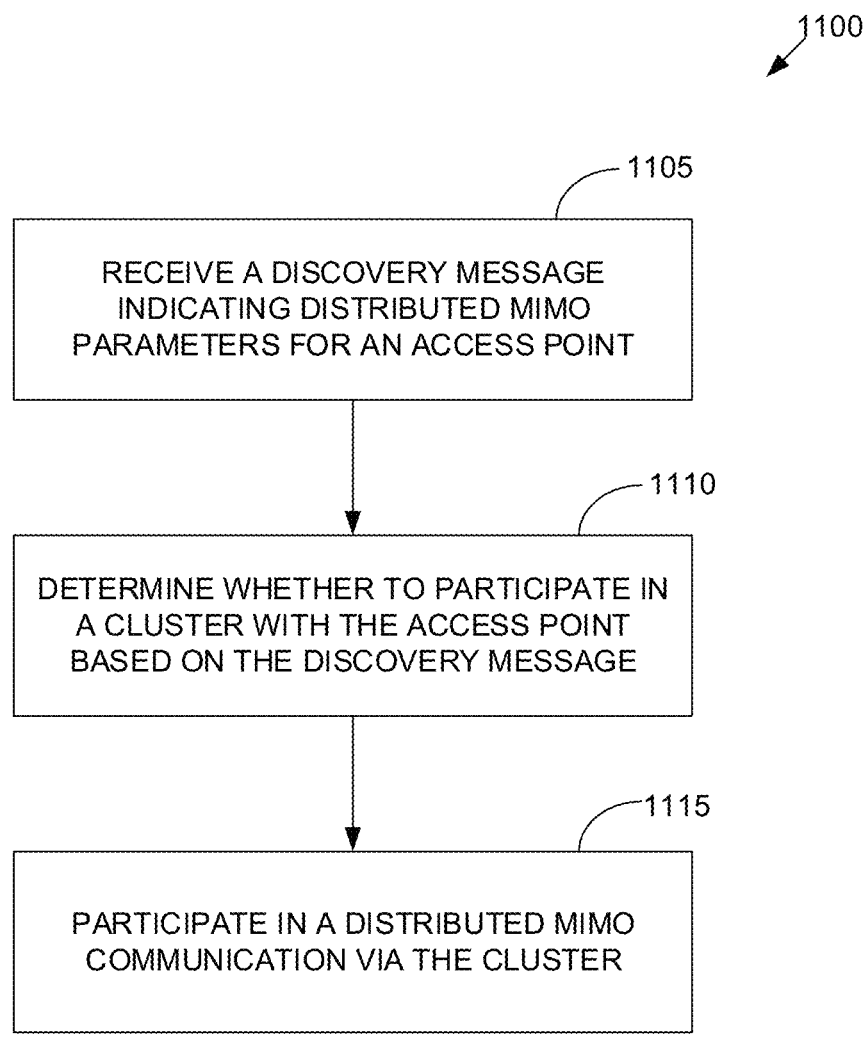
FIG. 11 is a flowchart of an exemplary access point discovery method.

FIG. 11 is a flowchart of an exemplary access point discovery method. In some aspects, the process 1100 discussed below with respect to FIG. 11 may be performed by the wireless device 202. For example, in some aspects, the memory 206 may store instructions that configure the processor 204 to perform one or more of the functions discussed below with respect to FIG. 11.

Some aspects of process 1100 provide a method of discovering access points for distributed MIMO communication.

In block 1105, a discovery message is received. The discovery message indicates distributed MIMO parameters for an access point. The message may be received from the access point, a station, or a second access point. In some aspects, if received from the station, the station may be associated with the subject device, which may be yet another access point. The message may be received via a wireless network, or alternatively, the message may be received via a backhaul network, for example, as shown in FIG. 10 above.

In some aspects, the received discovery message may include one or more of the fields discussed above with respect to FIG. 6A and message 600. Some aspects of block 1105 include tuning a wireless receiver to a channel, and listening on the channel for a discovery message from the access point. Listening may simply comprise waiting for one or more packets to be received on the tuned channel, and decoding any received packets to determine if the decoded packets are access point discovery messages. In some aspects, a particular channel may not be assigned for discovery messages. In these aspects, a device performing process 1100 ("subject device") may iteratively tune its receiver to different channels and listen on the different channels for discovery messages.

In some aspects, the received message may indicate a primary channel of the access point, or other discovery information for the access point. Based on the information included in the message, the subject device, such as an access point, may listen for a discovery message transmitted from the access point. For example, the received message may indicate a primary channel for the access point. The access point may be configured to transmit discovery messages on its primary channel. Thus, by tuning its receiver to the access point's primary channel, the subject device may be able to receive and decode a second discovery message transmitted directly by the access point. If the access point is outside a reception range of the subject device, then no second discovery message from the access point may be received and/or properly decoded. Whether the two devices are within range of each other may affect whether the subject device attempts to participate in a cluster with the access point.

Some aspects of process 1100 include joining a neighbor aware network. As discussed above with respect to FIG. 7, the neighbor aware network may provide functionality for synchronizing a discovery window across devices that are members of the neighbor aware network. In these aspects, the message may be received during the discovery window. In some aspects, the subject device may also tune its receiver to a particular channel during the discovery window. The particular channel may be a channel determined to possibly include transmissions of access point discovery message(s). After the discovery window passes, the device may tune its receiver to other channels, for example, those channels used to communicate downlink and/or uplink messages with stations associated with the device.

In block 1110, a determination is made whether to participate in a cluster with the access point identified by the discovery message. This may include one of forming a new cluster that includes the subject device and the second access point, joining a cluster in which the second access point is already participating, or having the second access point join a cluster in which the subject device is already a member of. For example, the discovery message for the second access point may indicate cluster information, with one embodiment of such cluster information shown above with respect to FIG. 6A and message 600.

In some aspects, capabilities indicated in the discovery message may be compared to capabilities of the subject device. The decision on whether to form a new cluster, join an existing cluster, or accept a new member access point into a cluster of which the subject device is already a member may be based on the capabilities comparison. For example, if a cluster of which the access point is a member has greater capabilities than a cluster of which the subject device is a member, then the subject device may determine that joining the access point's cluster is appropriate. As one example, one cluster may have lower utilization of spatial dimensions than a second cluster. Thus, it may be more advantageous to have additional access points join the underutilized cluster, and have those access points leave a more highly utilized cluster. This may achieve some level of load balancing between adjacent clusters.

In some aspects, a formation time of two clusters may be compared when determining whether the subject device will join a cluster of the access point, whether the access point will join a cluster of the subject device, or whether a new cluster will be formed, in which the two devices may both participate.

In some aspects, one or more operating parameters of the subject device may be modified as part of a decision to participate in a cluster with the access point. For example, one or more of an operating channel and an operating bandwidth of the subject device may be modified to be consistent with the access point in some aspects. Alternatively, the access point may adapt one or more of its operating parameters to participate in a cluster with the subject device.

In some aspects, the subject device and the access point may negotiate to determine which operating parameters are adopted such that the two devices may participate in the same cluster. In some aspects, these negotiations may result in a determination of whether the subject device or the access point taken on a cluster leader role for the cluster in which both devices are participating.

In block 1115, a portion of a distributed MIMO communication is performed via the cluster. For example, block 1115 may include coordinating a first transmission of a downlink communication or first receiving an uplink communication with the access point. The access point may also perform a corresponding uplink or downlink transmission at least simultaneously with the first communication.

Figure 12:
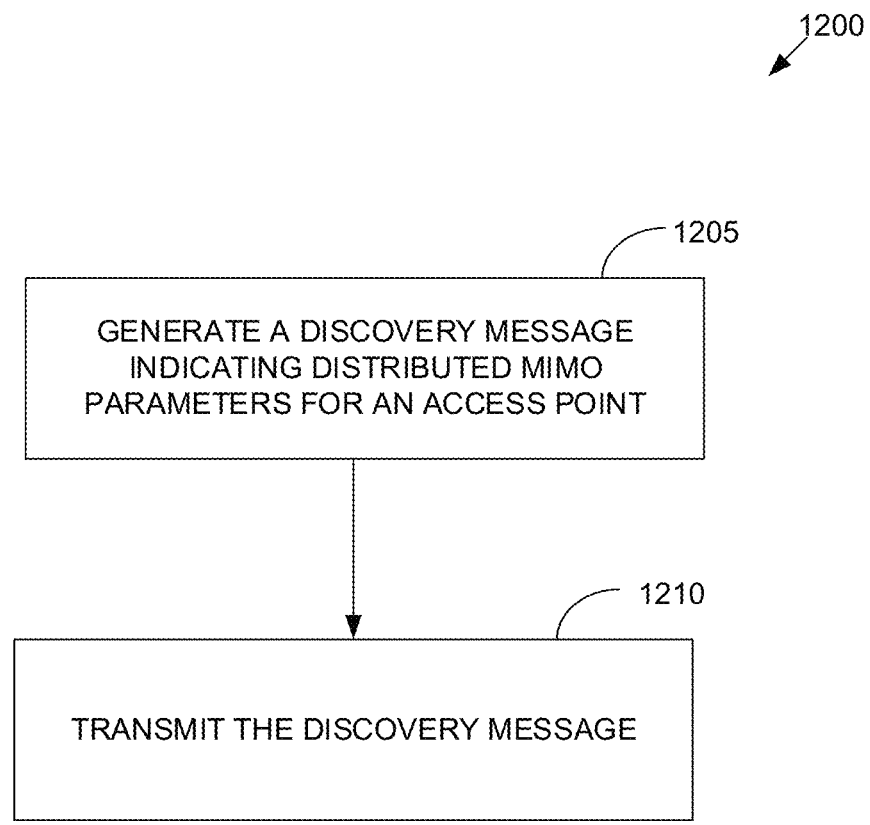
FIG. 12 is a flowchart of an exemplary access point discovery method.

FIG. 12 is a flowchart of an exemplary access point discovery method. In some aspects, the process 1200 discussed below with respect to FIG. 12 may be performed by the wireless device 202. For example, in some aspects, the memory 206 may store instructions that configure the processor 204 to perform one or more of the functions discussed below with respect to FIG. 12.

Some aspects of process 1200 provide a method of discovering access points for distributed MIMO communication.

In block 1205, a message is generated. The message is generated to indicate the access point provides a distributed MIMO capability. In some aspects, the message is generated as an access point discovery message. For example, in some aspects, the message is generated to include one or more of the fields discussed above with respect to FIG. 6A.

Some aspects include joining an access point cluster. In these aspects, the message generated in block 1205 may be generated to include one or more of the fields 720, 722, 724, 725, 726, 728, or 730 discussed above with respect to FIG. 6A. In some aspects, the message may be generated to indicate one or more of fields 732, 734, or 736 discuss above with respect to FIG. 6A.

In some aspects, the message may be generated to indicate an average or maximum dimension usage of the cluster, and/or an average or maximum dimension usage of the access point. In some aspects, the message may be generated to indicate one or more of a primary channel of the access point, and a target beacon transmission time. For example, as shown in FIG. 6A, the message 600 may be generated to include a primary channel field 722 and/or 760 and/or a target beacon transmission time field 762.

In block 1210, the message generated in block 1205 is transmitted on a network. In some aspects, the message may be transmitted on a wireless network, such as the wireless networks shown in any of FIGS. 7-10. In some aspects, the message may be transmitted over a back-haul network, such as back-haul network 1004 illustrated in FIG. 10 above. In some aspects of block 1210, the message is generated on an operating channel of an access point. For example, the message may be transmitted over a channel that is also used for communication with associated stations. For example, the discovery message may be transmitted over a channel used for uplink and/or downlink data communications by an access point. In some other aspects, the message may be transmitted on a channel that is different than the operating channel. For example, a channel may be predetermined to be used by multiple access points for transmission of access point discovery messages. This predetermined channel may be referred to as a "common" channel. In some aspects, the message is transmitted over the common channel.

Some aspects of process 1200 include joining a neighbor aware network. As discussed above with respect to FIG. 7, the neighbor aware network may provide functionality for synchronizing a discovery window across devices that are members of the neighbor aware network. In these aspects, the message may be transmitted during the discovery window. In some aspects, the device performing process 1200 ("subject device") may also tune its receiver to a particular channel during the discovery window. The particular channel may be a channel determined to possibly include transmissions of access point discovery message(s). After the discovery window passes, the device may tune its receiver to other channels, for example, those channels used to communicate downlink and/or uplink messages with stations associated with the device.

Some aspects of process 1200 include tuning a wireless receiver to a channel, and listening on the channel for a discovery message from another access point. Listening may simply comprise waiting for one or more packets to be received on the tuned channel, and decoding any received packets to determine if the decoded packets are access point discovery messages. In some aspects, a particular channel may not be assigned for discovery messages. In these aspects, the subject device may iteratively tune its receiver to different channels and listen on the different channels for discovery messages.

Some aspects of process 1200 include receiving a message from a station or an access point. If received from a station, the station may be associated with the subject device in some aspects. In some aspects, the message may be received over a backhaul network, such as the backhaul network 1004 illustrated in FIG. 10. The message may indicate a primary channel, or other discovery information for a second access point. For example, the message may indicate one or more of the fields discussed above with respect to message 600 and FIG. 6A. Based on the information included in the message, the subject device, such as an access point, may listen for a discovery message from the second access point. For example, the received message may indicate a primary channel for the second access point. The second access point may be configured to transmit discovery messages on its primary channel. Thus, by tuning its receiver to the second access point's primary channel, the subject device may be able to receive and decode a discovery message transmitted by the second access point. If the second access point is outside a reception range of the subject device, then of course no discovery message from the second access point may be received and/or properly decoded. Whether the two access points are within range of each other may affect whether the subject device attempts to participate in a cluster with the second access point.

Some aspects include determining whether to participate in a cluster with the second access point. This may include one of forming a new cluster that includes the subject device and the second access point, joining a cluster in which the second access point is already participating, or having the second access point join a cluster in which the subject device is already a member of. For example, the discovery message for the second access point may indicate cluster information, with one embodiment of such cluster information shown above with respect to FIG. 6A and message 600.

In some aspects, capabilities indicated in the discovery message may be compared to capabilities of the subject device. The decision on whether to form a new cluster, join an existing cluster, or accept a new member access point into a cluster of which the subject device is already a member may be based on the capabilities comparison. For example, if a cluster of which the second access point is a member has greater capabilities than a cluster of which the subject device is a member, then the subject device may determine that joining the second access point's cluster is appropriate. As one example, one cluster may have lower utilization of spatial dimensions than a second cluster. Thus, it may be more advantageous to have additional access points join the underutilized cluster, and have those access points leave a more highly utilized cluster. This may achieve some level of load balancing between adjacent clusters.

In some aspects, a formation time of two clusters may be compared when determining whether the subject device will join a cluster of the second access point, whether the second access point will join a cluster of the subject device, or whether a new cluster will be formed, in which the two devices may both participate.

In some aspects, one or more operating parameters of the subject device may be modified as part of a decision to participate in a cluster with the second access point. For example, one or more of an operating channel and an operating bandwidth of the subject device may be modified to be consistent with the second access point in some aspects. Alternatively, the second access point may adapt one or more of its operating parameters to participate in a cluster with the subject device.

In some aspects, the subject device and the second access point may negotiate to determine which operating parameters are adopted such that the two devices may participate in the same cluster. In some aspects, these negotiations may result in a determination of whether the subject device or the second access point taken on a cluster leader role for the cluster in which both devices are participating. For example, as discussed above with respect to FIG. 6B, the subject device may transmit an embodiment of the message 650 to a second access point. The message 650 may request that the second access point form a new cluster or merge existing clusters with the subject device, or that the subject device join a cluster of the second access point. The second access point may respond with an embodiment of message 675, indicating whether the request from the subject device is accepted or not. The message 675 may optionally indicate, as discussed above, operational parameters of the cluster after the requested operation of message 650 has been completed.

FIG. 13 is a diagram illustrating formation of a new access point cluster. FIG. 13 shows two clusters 1302a-b, each including at least one access point 104a-b respectively. The two access points 104a-b of FIG. 13 may exchange access point discovery messages, such as an embodiment of the message 600 discussed above. Based on the exchange of discovery messages, the APs 104a-b may determine if the other AP has compatible capabilities. For example, each AP may determine whether the other AP is within a wireless transmission and/or reception range, and whether it is beneficial to participate in a cluster with the other AP. Whether it is beneficial may be based on whether spatial dimensions of each of the clusters 1302a-b is underutilized or not. For example, if the spatial utilization of one of the clusters 1302a-b is below a threshold or meets a particular criteria, then the cluster may be determined to be underutilized.

Depending on the evaluation, the two APs 104a-b may determine to form a new cluster 1304 including the two APs 104a-b. The formation of the new cluster 1304 may be facilitated via an exchange of messages between the APs 104a-b. For example, the exchange of messages may include exchanging embodiments of the message 600 discussed above. The exchanged messages may include one or more of a distributed MIMO type, a cluster identifier, cluster leader AP identifier, primary channel of the cluster, bandwidth of the cluster, guard interval and/or long training field duration supported by the cluster. The exchange of messages may be performed by the APs 104a-b via a wireless or wired network. In some aspects, the messages may be exchanged over a back-haul network.

FIG. 14 is a diagram illustrating an access point joining an existing cluster of another access point. FIG. 14 shows APs 104a-b as part of a cluster 1402a. The AP 104c may be part of a cluster 1402b.

The access point 104c may receive a discovery message from at least one of the access points 104a-b, such as an embodiment of the message 600 discussed above. For example, the message may include one or more of a distributed MIMO type, a cluster identifier, cluster leader AP identifier, primary channel of the cluster, bandwidth of the cluster, guard interval and/or long training field duration supported by the cluster. The discovery message may be received by the AP 104c via a wireless or wired network. In some aspects, the messages may be exchanged over a back-haul network. Based on the received discovery message, the AP 104c may determine whether to join the cluster 1402a. For example, the AP 104c may determine whether the cluster 1402a is within a wireless transmission and/or reception range, and whether it is beneficial to participate in the cluster 1402a. Whether it is beneficial may be based on whether spatial dimensions of the cluster 1402a is underutilized or not. For example, if the spatial utilization of the cluster 1402a is below a threshold or meets a particular criteria, then the cluster 1402a may be determined to be underutilized by the AP 104c. Depending on the evaluation, the AP 104c may determine to join the cluster 1402a including the two APs 104a-b.

Figure 15:
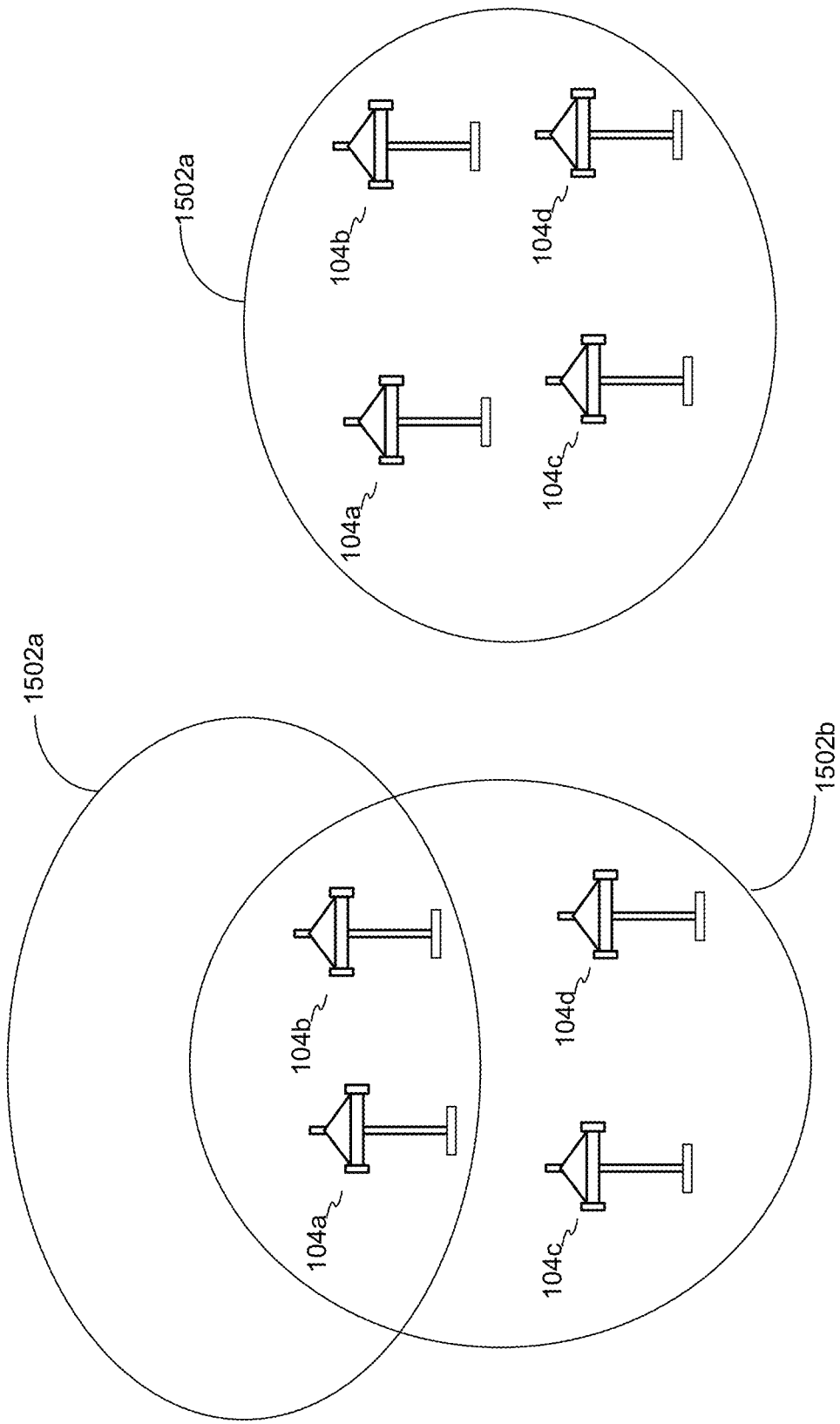
FIG. 15 is a diagram illustrating the merging of two access point clusters.

FIG. 15 is a diagram illustrating the merging of two access point clusters. FIG. 15 shows two clusters 1502a-b. Cluster 1502a includes APs 104a-b, while cluster 1502b includes APs 104c-d. The AP 104a may receive an embodiment of a discovery message, such as message 600 discussed above, identifying one of APs 104c-d and the cluster 1502b.

Based on information included in the received message, the AP 104a may determine if the cluster 1502b is capability compatible with members of the cluster 1502a (i.e. at least AP 104b). The AP 104a may also determine if members of both clusters (1502a-b) are in range, and whether it is beneficial to merge the two clusters. As discussed above, whether it is beneficial to merge the two clusters may consider the degree of geographic overlap between wireless transmission and/or reception range of APs of the different clusters, a spatial utilization of each of the clusters, the number of APs and/or STAs present in each of the clusters, a formation time of one or both clusters, along with additional considerations in some aspects. For example, in some aspects, a younger cluster will join an older cluster. In some aspects, a cluster with fewer stations and/or APs may join a cluster with more stations and/or APs.

In the above description, reference numbers may have been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor or any commercially available processor, controller, microcontroller or state machine. A processor may also be implemented as a combination of computing devices (e.g., a combination of a DSP and a microprocessor, a plurality of microprocessors, one or more microprocessors in conjunction with a DSP core, or any other such configuration).

In one or more aspects, the functions described may be implemented in hardware, software, firmware, or any combination thereof. If implemented in software, the functions may be stored on or transmitted over as one or more instructions or code on a computer-readable medium.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of discovering access points for distributed multiple-in-multiple-out (MIMO) communication, comprising:
   generating, by a first access point, a first message indicating the first access point has distributed MIMO capability, and further indicating an average or maximum spatial dimension usage of the first access point and a maximum number of spatial dimensions of the first access point;
   transmitting, by the first access point, the first message on a wireless network;
   receiving, by the first access point, a second message from a second access point, the second message identifying a cluster; and
   determining, by the first access point, to participate in the identified cluster in response to the second message.

2. The method of claim 1, further comprising generating, by the first access point, the first message to further indicate one or more of a supported distributed MIMO type, a supported bandwidth set, a number of spatial dimensions per supported bandwidth, an indication of whether full bandwidth or partial bandwidth operation is supported by the first access point for each bandwidth in the bandwidth set, a number of sounding dimensions, and guard intervals and long training field durations supported by the first access point.

3. The method of claim 1, wherein participating in the cluster comprises causing the second access point to join the cluster and further comprising generating, by the first access point, the first message to further indicate one or more of a distributed MIMO type of the cluster, a primary channel of the cluster, an operating bandwidth of the cluster, a cluster identifier for the cluster, an identifier of a leader access point for the cluster, and an identifier of a member access point of the cluster.

4. The method of claim 3, further comprising generating, by the first access point, the first message to further indicate one of a number of access points in the cluster, a number of stations in the cluster, and a cluster formation time.

5. The method of claim 3, further comprising generating, by the first access point, the first message to further indicate an average or maximum spatial dimension usage of the cluster and a maximum number of spatial dimensions of the cluster.

6. The method of claim 1, further comprising, generating, by the first access point, the first message to further indicate one or more of a primary channel of the first access point, and a target beacon transmission time.

7. The method of claim 1, further comprising transmitting the first message on an operating channel of the first access point.

8. The method of claim 1, further comprising transmitting the first message on a common channel.

9. The method of claim 1, further comprising
receiving, by the first access point, a third message from a station, the third message indicating a primary channel for the second access point; and
listening, by the first access point, for the second message from the second access point on the indicated primary channel.

10. The method of claim 1, wherein the second message indicates a primary channel for a third access point and further comprising tuning a receiver to the indicated primary channel in response to the second message.

11. The method of claim 1, wherein the second message from the second access point is received over a second network and further comprising turning a receiver to a primary channel of the second access point indicated in the second message.

12. The method of claim 1, wherein participating in the identified cluster comprises forming a new cluster with the second access point.

13. A method of discovering access points for distributed MIMO communication, comprising:
receiving, by a first access point, a message indicating a second access point has distributed MIMO capability;
decoding the message to identify a cluster and to determine a utilization of spatial dimensions of the identified cluster;
determining, by the first access point, to participate in the identified cluster in a distributed MIMO communication; and
joining, by the first access point, the identified cluster based on the utilization, wherein the identified cluster is a cluster of the second access point.

14. The method of claim 13, further comprising decoding the message to indicate that the second access point supports a distributed MIMO type comprising one or more of downlink coordinated beamforming, uplink coordinated beamforming, downlink joint MIMO, and uplink joint MIMO.

15. The method of claim 13, further comprising:
determining a common discovery time window across the first and second access points; and
listening for the message during the discovery time window, wherein the reception of the message occurs during the discovery time window.

16. The method of claim 13, further comprising:
tuning a receiver of the first access point to a channel;
listening, via the receiver, on the channel; and
receiving, via the receiver, the message from the second access point on the channel.

17. The method of claim 13, wherein participating in the cluster comprises forming a new cluster with the second access point.

18. The method of claim 13, further comprising:
decoding, by the first access point, the message to determine that the identified cluster is a cluster of the second access point; and
joining, by the first access point, the identified cluster.

19. The method of claim 13, further comprising:
comparing, by the first access point, capabilities of a cluster of the second access point identified in the message with capabilities of the first access point, and
joining, by the first access point, the identified cluster based on the comparison.

20. The method of claim 13, further comprising:
decoding the message to determine one or more third access points within a cluster of the second access point; and
determining whether the first access point is within a wireless network reception and transmission range of the one or more third access points;
wherein the determination of whether to participate in the cluster of the second access point is further based on whether the first access point is within the wireless network reception and transmission range.

21. The method of claim 13, further comprising modifying one or more of a primary operating channel and an operating bandwidth of the first access point in response to a determination to participate with the second access point in the cluster.

22. The method of claim 13, further comprising:
participating in the identified cluster based on the decoded message, wherein the identified cluster is a cluster of the second access point.

23. The method of claim 13, further comprising negotiating with the second access point to determine whether the first access point or the second access point is a leader of the identified cluster.

24. The method of claim 13, further comprising modifying one or more of a primary operating channel and an operating bandwidth of the first access point in response to the participating.

25. The method of claim 13, further comprising:
decoding the message to determine a formation time for a first cluster including the second access point;
comparing the formation time of the first cluster with a formation time of a second cluster of the first access point; and
merging the first and second clusters based on the comparison.

26. The method of claim 13, further comprising:
decoding the message to determine a number of stations or a number of third access points in a first cluster including the second access point;
comparing the number of stations or third access points with corresponding numbers of a second cluster of the first access point; and
merging the first and second clusters based on the comparison.

27. An apparatus for discovering access points for distributed MIMO communication, comprising:
a hardware processor, configured to generate a first message indicating a first access point has distributed MIMO capability, and further indicating an average or maximum spatial dimension usage of the first access point and a maximum number of spatial dimensions of the first access point;

a transmitter, configured to transmit the first message on a wireless network; and a receiver, configured to receive a second message from a second access point, the second message identifying a cluster, wherein the hardware processor is further configured to participate in the identified cluster in response to the second message.

28. An apparatus for discovering access points for distributed MIMO communication, comprising:

a receiver configured to receive, by a first access point, a message indicating a second access point has distributed MIMO capability; and a hardware processor configured to:

decode the message to identify a cluster and to determine a utilization of spatial dimensions of the identified cluster, determine to participate in the identified cluster in a distributed MIMO communication; and joining, by the first access point, the identified cluster based on the utilization, wherein the identified cluster is a cluster of the second access point.

\* \* \* \* \*